US010185387B2

United States Patent
Hayashi et al.

(10) Patent No.: US 10,185,387 B2
(45) Date of Patent: Jan. 22, 2019

(54) COMMUNICATION APPARATUS, COMMUNICATION METHOD, AND COMPUTER READABLE RECORDING MEDIUM

(71) Applicant: Olympus Corporation, Hachioji-shi, Tokyo (JP)

(72) Inventors: Toshikazu Hayashi, Sagamihara (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 113 days.

(21) Appl. No.: 15/336,496

(22) Filed: Oct. 27, 2016

(65) Prior Publication Data

US 2017/0045933 A1 Feb. 16, 2017

Related U.S. Application Data

(63) Continuation of application No. 13/789,915, filed on Mar. 8, 2013, now Pat. No. 9,513,697.

(30) Foreign Application Priority Data

Mar. 8, 2012 (JP) ................................ 2012-052151

(51) Int. Cl.

| | |
|---|---|
| ***G06F 3/0488*** | (2013.01) |
| ***H04W 12/06*** | (2009.01) |
| ***G06F 3/01*** | (2006.01) |
| ***H04W 12/04*** | (2009.01) |
| *H04W 76/10* | (2018.01) |
| *H04W 84/10* | (2009.01) |

(52) U.S. Cl.

CPC ........... *G06F 3/01* (2013.01); *G06F 3/04883* (2013.01); *H04W 12/04* (2013.01); *H04W 12/06* (2013.01); *H04W 76/10* (2018.02); *H04W 84/10* (2013.01)

(58) Field of Classification Search

CPC .... G06F 3/04883; G06F 3/0488; G06F 3/017; H04W 12/06; H04M 1/7253

See application file for complete search history.

(56) References Cited

U.S. PATENT DOCUMENTS

| | | | | |
|---|---|---|---|---|
| 6,545,669 | B1 * | 4/2003 | Kinawi | G06F 3/0486 345/1.1 |
| 8,539,550 | B1 * | 9/2013 | Terres | G06F 21/31 726/16 |
| 8,913,028 | B2 * | 12/2014 | Chin | G06F 21/36 345/173 |
| 2004/0268152 | A1 * | 12/2004 | Xia | H04L 63/0281 726/5 |
| 2006/0095941 | A1 * | 5/2006 | Fidler | H04L 29/06027 725/81 |

(Continued)

*Primary Examiner* — Antonio Xavier

(74) *Attorney, Agent, or Firm* — John C. Pokotylo; Pokotylo Patent Services

(57) ABSTRACT

A communication apparatus includes a transceiving unit that transmits content data to a portable apparatus and receives temporal change information of a touch position from the portable apparatus, and a transmission control unit that establishes wireless communication between the portable apparatus and the communication apparatus and causes the transceiving unit to transmit the content data to the portable apparatus when the temporal change information of the touch position received by the transceiving unit is substantially identical with preset setting information.

17 Claims, 13 Drawing Sheets

START
S101 SHOOTING MODE? NO
YES S102 START IMAGING
S103 DISPLAY LIVE VIEW IMAGE
S104 SHOOTING? NO
YES S105 SHOOTING
S107 PLAYBACK MODE? NO
YES S108 DISPLAY IMAGE LIST
S109 IS PLAYBACK IMAGE SELECTED? NO
YES S110 PERFORM PLAYBACK
S111 IS TOUCH OPERATION PERFORMED? NO
YES S112 RECORD TOUCH INFORMATION IN CORRESPONDENCE WITH SETTING INFORMATION
S113 IS TOUCH INFORMATION RECEIVED? NO
YES S114 PATTERNS OF SAME CHARACTERISTICS? NO
YES S115 TRANSMIT CONTENT DATA
S116 RECEPTION MODE? NO
YES S117 IS TOUCH OPERATION PERFORMED? NO
YES S118 DETERMINE TOUCH PATTERN
S119 TRANSMIT TOUCH INFORMATION
S120 IS CONTENT DATA RECEIVED? NO
YES S121 DISPLAY CONTENT DATA
S106 ENDED? NO
YES
END

(56) References Cited

U.S. PATENT DOCUMENTS

2007/0123165 A1* 5/2007 Sheynman .......... H04M 1/7253 455/41.2
2007/0124503 A1* 5/2007 Ramos .................... G06F 3/017 709/248
2008/0163130 A1* 7/2008 Westerman ......... G06F 3/04883 715/863
2009/0085877 A1* 4/2009 Chang .................. G06F 3/0488 345/173
2009/0165121 A1* 6/2009 Kumar .................. G06F 21/316 726/19
2009/0235327 A1* 9/2009 Jakobsson ............... G06F 21/31 726/2
2010/0079388 A1* 4/2010 Ohnishi .............. G06F 3/04845 345/173
2010/0081375 A1* 4/2010 Rosenblatt ............. G08C 17/02 455/41.1
2010/0082990 A1* 4/2010 Grigorovitch ........ H04W 12/06 713/176
2010/0225744 A1* 9/2010 Tomizawa ............. G03B 17/18 348/47
2010/0240403 A1* 9/2010 Yu ........................... H04W 4/12 455/466
2011/0041102 A1* 2/2011 Kim .................... G06F 3/04883 715/863
2011/0156867 A1* 6/2011 Carrizo .............. G06K 9/00167 340/5.85
2011/0187497 A1* 8/2011 Chin ....................... G06F 21/00 340/5.54
2011/0231796 A1* 9/2011 Vigil ................... G06F 3/04883 715/810
2011/0237193 A1* 9/2011 Shen ..................... G06F 1/1694 455/41.2
2011/0238725 A1* 9/2011 Imai ....................... H04N 5/772 709/201
2012/0077436 A1* 3/2012 Konded .............. G06F 3/04883 455/41.2
2012/0110470 A1* 5/2012 Mistry .................. G06F 3/0486 715/748
2012/0117637 A1* 5/2012 Little .................. H04L 63/0853 726/9
2012/0133484 A1* 5/2012 Griffin .................... G06F 21/51 340/5.54
2012/0214416 A1* 8/2012 Kent ....................... H04W 4/21 455/41.2
2012/0246737 A1* 9/2012 Paxton .................. G06F 21/316 726/27
2012/0297190 A1* 11/2012 Shen ..................... H04L 9/0866 713/168
2013/0090065 A1* 4/2013 Fisunenko .............. H04W 4/70 455/41.2
2013/0141331 A1* 6/2013 Shiu ....................... G09G 5/003 345/158
2013/0165098 A1* 6/2013 Nakazawa ............ H04W 76/02 455/418
2013/0169550 A1* 7/2013 Gai ......................... G06F 3/041 345/173
2013/0231065 A1* 9/2013 Hayashi .............. H04M 1/7253 455/73
2014/0006954 A1* 1/2014 Raffa .................. G06F 3/04883 715/733
2016/0156635 A1* 6/2016 Liu ....................... H04W 12/06 726/4

* cited by examiner

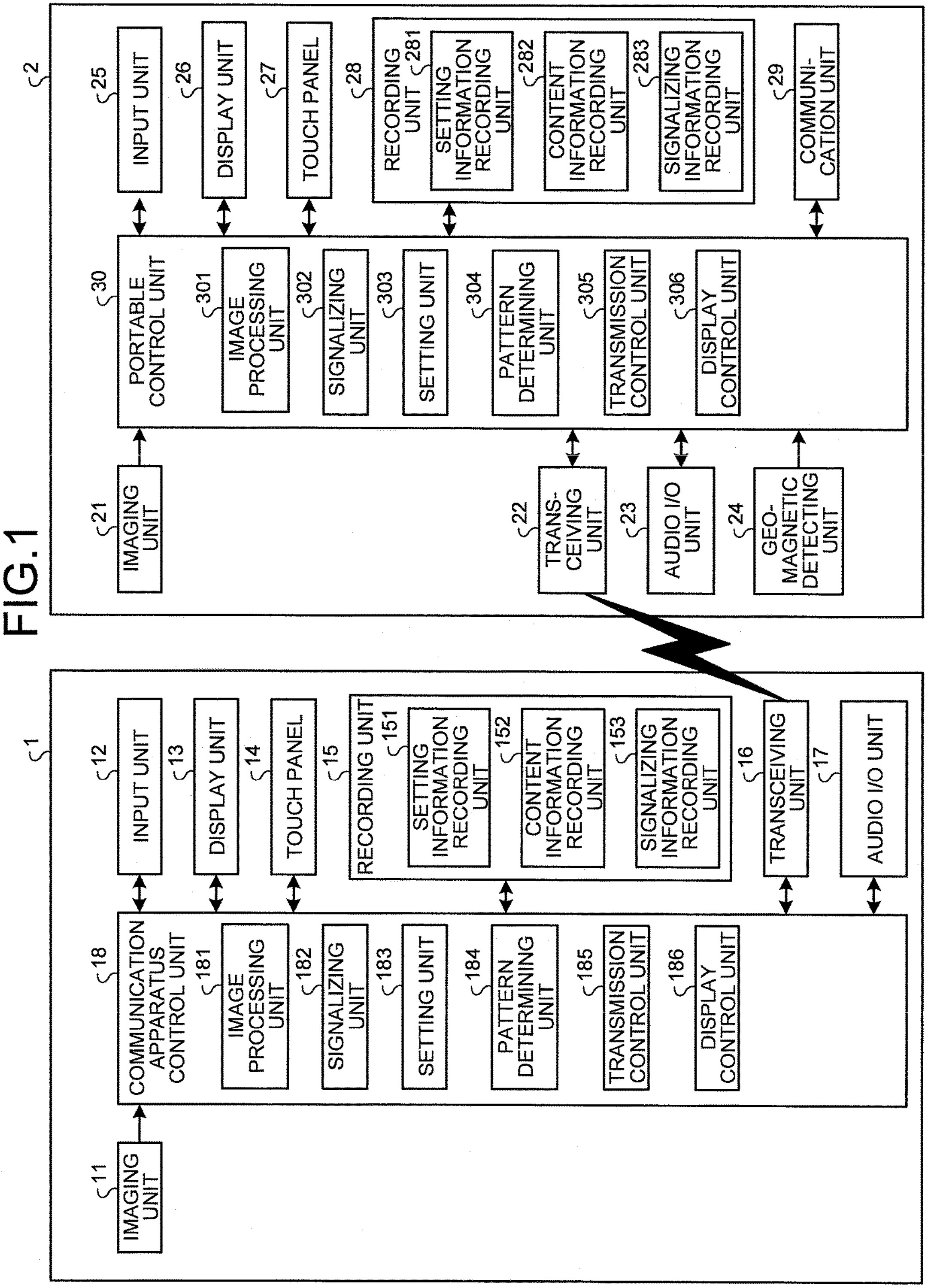
FIG.1
2
25 INPUT UNIT
26 DISPLAY UNIT
27 TOUCH PANEL
28 RECORDING UNIT
281 SETTING INFORMATION RECORDING UNIT
282 CONTENT INFORMATION RECORDING UNIT
283 SIGNALIZING INFORMATION RECORDING UNIT
29 COMMUNI-CATION UNIT
30 PORTABLE CONTROL UNIT
301 IMAGE PROCESSING UNIT
302 SIGNALIZING UNIT
303 SETTING UNIT
304 PATTERN DETERMINING UNIT
305 TRANSMISSION CONTROL UNIT
306 DISPLAY CONTROL UNIT
21 IMAGING UNIT
22 TRANS-CEIVING UNIT
23 AUDIO I/O UNIT
24 GEO-MAGNETIC DETECTING UNIT
1
12 INPUT UNIT
13 DISPLAY UNIT
14 TOUCH PANEL
15 RECORDING UNIT
151 SETTING INFORMATION RECORDING UNIT
152 CONTENT INFORMATION RECORDING UNIT
153 SIGNALIZING INFORMATION RECORDING UNIT
16 TRANSCEIVING UNIT
17 AUDIO I/O UNIT
18 COMMUNICATION APPARATUS CONTROL UNIT
181 IMAGE PROCESSING UNIT
182 SIGNALIZING UNIT
183 SETTING UNIT
184 PATTERN DETERMINING UNIT
185 TRANSMISSION CONTROL UNIT
186 DISPLAY CONTROL UNIT
11 IMAGING UNIT

| | TOUCH START POSITION (UPPER AND LOWER) | TOUCH START POSITION (RIGHT AND LEFT) | INITIAL SLIDE (FIRST-HALF) | INITIAL SLIDE (SECOND-HALF) | NEXT SLIDE (FIRST-HALF) |
|---|---|---|---|---|---|
| 01 | MIDST | MIDST | POINT | NO | NO |
| 02 | 1/4 FROM UPPER SIDE | 1/4 FROM LEFT SIDE | RIGHT DIRECTION | RIGHT DIRECTION | POINT |
| 03 | 2/4 FROM UPPER SIDE | 2/4 FROM LEFT SIDE | LOWER RIGHT DIRECTION | LOWER RIGHT DIRECTION | RIGHT DIRECTION |
| 04 | 3/4 FROM UPPER SIDE | 3/4 FROM LEFT SIDE | LOWER DIRECTION | LOWER DIRECTION | LOWER RIGHT DIRECTION |
| 05 | 4/4 FROM UPPER SIDE | 4/4 FROM LEFT SIDE | LOWER LEFT DIRECTION | LOWER LEFT DIRECTION | LOWER DIRECTION |
| | | | | | |
| 10 | | | | | UPPER RIGHT DIRECTION |
| DATA | 03 | 01 | 05 | 01 | 03 |

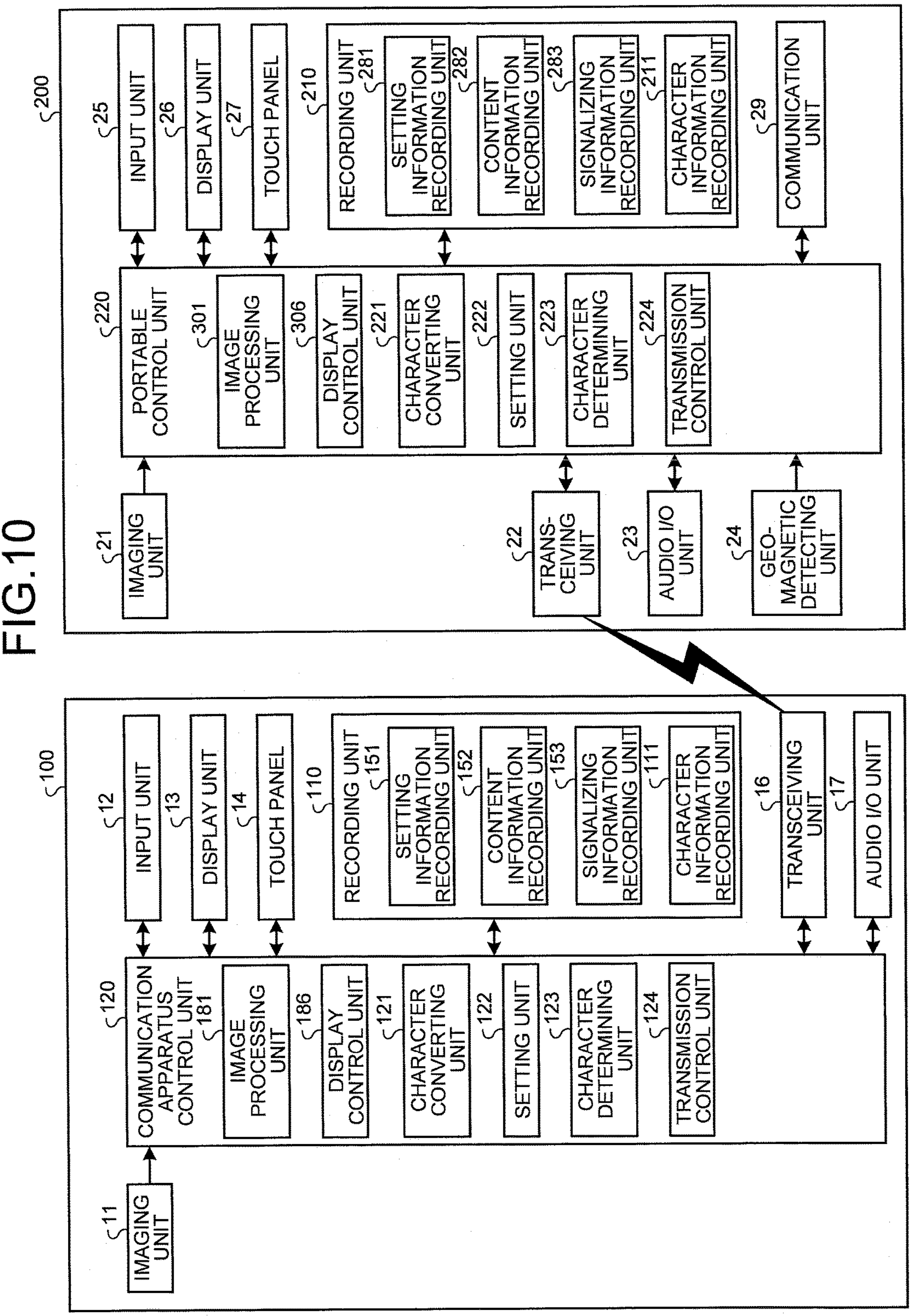
FIG.10
200
25 INPUT UNIT
26 DISPLAY UNIT
27 TOUCH PANEL
210 RECORDING UNIT
281 SETTING INFORMATION RECORDING UNIT
282 CONTENT INFORMATION RECORDING UNIT
283 SIGNALIZING INFORMATION RECORDING UNIT
211 CHARACTER INFORMATION RECORDING UNIT
29 COMMUNICATION UNIT
220 PORTABLE CONTROL UNIT
301 IMAGE PROCESSING UNIT
306 DISPLAY CONTROL UNIT
221 CHARACTER CONVERTING UNIT
222 SETTING UNIT
223 CHARACTER DETERMINING UNIT
224 TRANSMISSION CONTROL UNIT
21 IMAGING UNIT
22 TRANS-CEIVING UNIT
23 AUDIO I/O UNIT
24 GEO-MAGNETIC DETECTING UNIT
100
12 INPUT UNIT
13 DISPLAY UNIT
14 TOUCH PANEL
110 RECORDING UNIT
151 SETTING INFORMATION RECORDING UNIT
152 CONTENT INFORMATION RECORDING UNIT
153 SIGNALIZING INFORMATION RECORDING UNIT
111 CHARACTER INFORMATION RECORDING UNIT
16 TRANSCEIVING UNIT
17 AUDIO I/O UNIT
120 COMMUNICATION APPARATUS CONTROL UNIT
181 IMAGE PROCESSING UNIT
186 DISPLAY CONTROL UNIT
121 CHARACTER CONVERTING UNIT
122 SETTING UNIT
123 CHARACTER DETERMINING UNIT
124 TRANSMISSION CONTROL UNIT
11 IMAGING UNIT

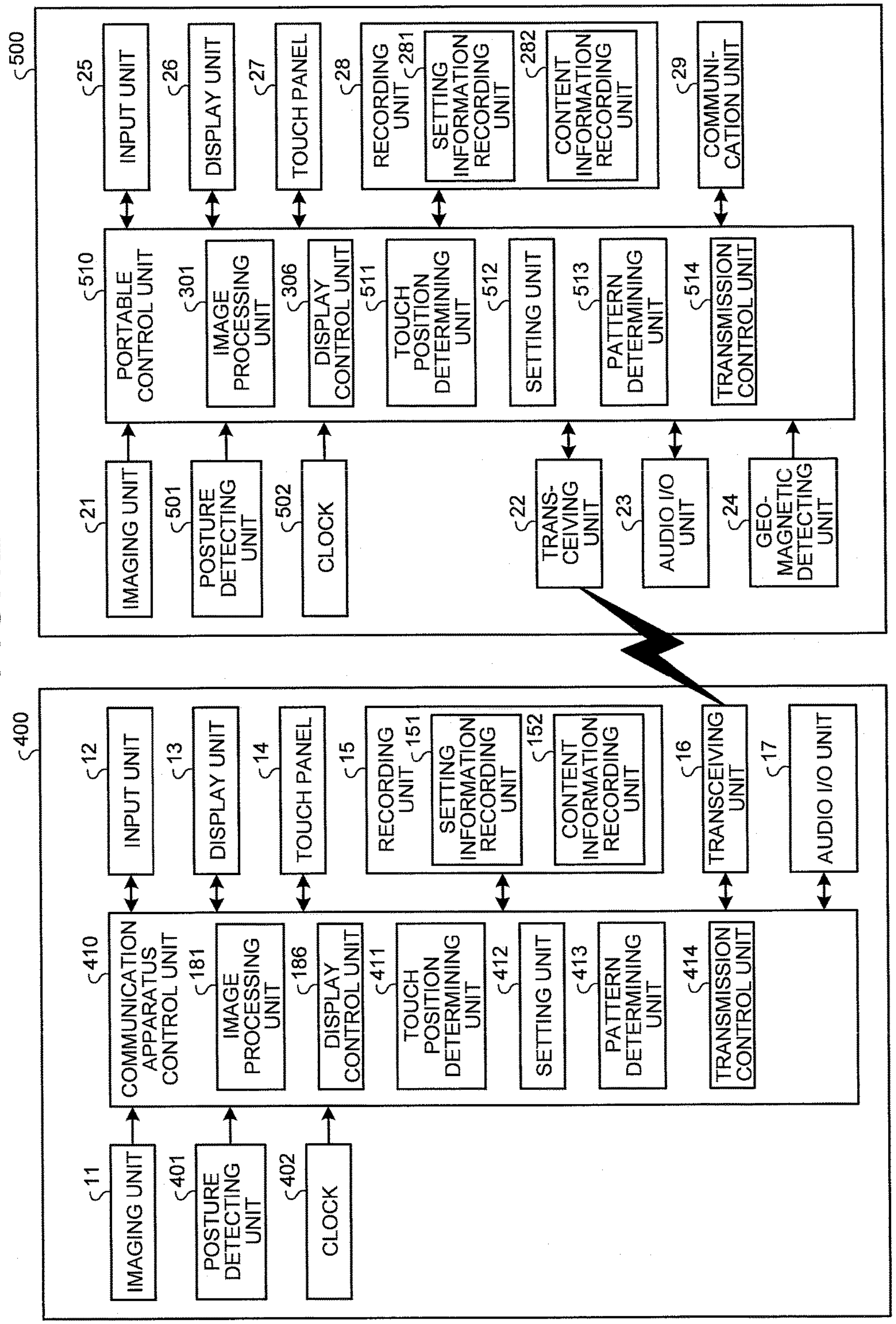
FIG.12
500
510
PORTABLE CONTROL UNIT
301
IMAGE PROCESSING UNIT
306
DISPLAY CONTROL UNIT
511
TOUCH POSITION DETERMINING UNIT
512
SETTING UNIT
513
PATTERN DETERMINING UNIT
514
TRANSMISSION CONTROL UNIT
25
INPUT UNIT
26
DISPLAY UNIT
27
TOUCH PANEL
28
RECORDING UNIT
281
SETTING INFORMATION RECORDING UNIT
282
CONTENT INFORMATION RECORDING UNIT
29
COMMUNI-CATION UNIT
21
IMAGING UNIT
501
POSTURE DETECTING UNIT
502
CLOCK
22
TRANS-CEIVING UNIT
23
AUDIO I/O UNIT
24
GEO-MAGNETIC DETECTING UNIT
400
410
COMMUNICATION APPARATUS CONTROL UNIT
181
IMAGE PROCESSING UNIT
186
DISPLAY CONTROL UNIT
411
TOUCH POSITION DETERMINING UNIT
412
SETTING UNIT
413
PATTERN DETERMINING UNIT
414
TRANSMISSION CONTROL UNIT
12
INPUT UNIT
13
DISPLAY UNIT
14
TOUCH PANEL
15
RECORDING UNIT
151
SETTING INFORMATION RECORDING UNIT
152
CONTENT INFORMATION RECORDING UNIT
16
TRANSCEIVING UNIT
17
AUDIO I/O UNIT
11
IMAGING UNIT
401
POSTURE DETECTING UNIT
402
CLOCK

COMMUNICATION APPARATUS, COMMUNICATION METHOD, AND COMPUTER READABLE RECORDING MEDIUM

CROSS REFERENCES TO RELATED APPLICATIONS

This application is a continuation application of U.S. patent application Ser. No. 13/789,915 (referred to as "the '915 application" and incorporated herein by reference), filed on Mar. 8, 2013, titled "COMMUNICATION APPARATUS, COMMUNICATION METHOD, AND COMPUTER READABLE RECORDING MEDIUM" and listing Toshikazu HAYASHI and Osamu NONAKA as inventors, the '915 application being based upon and claiming the benefit of priority from Japanese Patent Application No. 2012-052151, filed on Mar. 8, 2012, the entire contents of which are incorporated herein by reference.

BACKGROUND OF THE INVENTION

1. Field of the Invention

The present invention relates to a communication apparatus that transmits content data including image data to another electronic apparatus according to a specified wireless communication standard, a communication method by the communication apparatus, and a computer readable recording medium.

2. Description of the Related Art

It is known that content data including image data captured by a mobile phone with a camera or the like is transmitted to an external apparatus such as a personal computer according to a specified wireless communication standard (for example, see Japanese Patent No. 4174208). According to this technique, a bar code is displayed on a display of an apparatus of a transmission target as device address information necessary for wireless communication, and an image of the bar code is captured by a camera of a transmission side mobile phone to acquire the device address information from the bar code, so that setting for wireless communication can be automatically performed.

SUMMARY OF THE INVENTION

In accordance with some embodiments, a communication apparatus, a communication method by the communication apparatus, and a computer readable recording medium are presented.

In some embodiments, a communication apparatus performs bidirectional wireless communication with a portable apparatus having a touch panel configured to detect a touch of an object from outside and to receive an input of a position signal according to a detected position, and transmits content data including image data. The communication apparatus includes: a transceiving unit that transmits the content data to the portable apparatus and receives temporal change information of a position of the touch from the portable apparatus; and a transmission control unit that establishes the wireless communication between the portable apparatus and the communication apparatus and causes the transceiving unit to transmit the content data to the portable apparatus when the temporal change information of the position of the touch received by the transceiving unit is substantially identical with preset setting information.

In some embodiments, a communication apparatus includes: a transceiving unit that performs transmission and reception with an external apparatus; a setting unit; and a determining unit that determines whether a character set by the setting unit is identical with temporal change information of a touch on a touch panel received by the transceiving unit. The transceiving unit transmits content data to the external apparatus according to a determination result by the determining unit.

In some embodiments, a communication apparatus performs bidirectional wireless communication with a portable apparatus having a touch panel configured to detect a touch of an object from outside and to receive an input of a position signal according to a detected position, and transmits content data including image data. The communication apparatus includes: a transceiving unit that transmits the content data to the portable apparatus and receives trajectory information of the touch from the portable apparatus; and a transmission control unit that performs the wireless communication between the portable apparatus and the communication apparatus when the trajectory information of the touch received by the transceiving unit is substantially identical with a preset trajectory of the touch.

In some embodiments, a communication apparatus performs bidirectional wireless communication with a portable apparatus having a touch panel configured to detect a touch of an object from outside and to receive an input of a position signal according to a detected position, and transmits content data including image data. The communication apparatus includes: a transceiving unit that transmits the content data to the portable apparatus and receives character information drawn by the touch from the portable apparatus; and a transmission control unit that performs the wireless communication between the portable apparatus and the communication apparatus when drawing information of the touch received by the transceiving unit is substantially identical with preset character information.

In some embodiments, a communication apparatus performs bidirectional wireless communication with a portable apparatus having a touch panel configured to detect a touch of an object from outside and to receive an input of a position signal according to a detected position, and transmits content data including image data. The communication apparatus includes: a display unit that displays an image corresponding to the image data; a second touch panel that is superimposed on the display unit, detects a touch of an object from outside, and receives an input of a position signal according to a detected position; and a display control unit that causes the display unit to display a trajectory of a touch operation performed on the second touch panel based on the position signal input from the second touch panel.

In some embodiments, a communication method is performed by a communication apparatus that performs bidirectional wireless communication with a portable apparatus having a touch panel configured to detect a touch of an object from outside and to receive an input of a position signal according to a detected position, and transmits content data including image data. The method includes: receiving identification information of the portable apparatus, a password corresponding to the identification information, and temporal change information of a position of the touch regarding a touch pattern to be drawn on the touch panel of the portable apparatus to establish the wireless communication with the portable apparatus; and establishing the wireless communication between the portable apparatus and the communication apparatus and transmitting the content data to the potable apparatus when the temporal change information of the position of the touch is substantially identical with preset setting information.

In some embodiments, a non-transitory computer readable recording medium with an executable program stored thereon is presented. The program instructs a processor, which is disposed in a communication apparatus that performs wireless communication with another portable apparatus and transmits content data including image data, to execute: receiving identification information of the portable apparatus, a password corresponding to the identification information, and temporal change information of a touch position regarding a touch pattern to be drawn on a touch panel of the portable apparatus to establish the wireless communication with the portable apparatus; and establishing the wireless communication between the portable apparatus and the communication apparatus and transmitting the content data to the portable apparatus when the temporal change information of the touch position is substantially identical with preset setting information.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating configurations of a communication apparatus and a portable apparatus according to a first embodiment of the present invention;

FIG. 5 is a diagram illustrating the overview of a method by which a signalizing unit of the communication apparatus according to the first embodiment of the invention converts a trajectory of a touch panel by a user into numerical values;

FIG. 10 is a block diagram illustrating configurations of a communication apparatus and a portable apparatus according to a third embodiment of the present invention;

FIG. 12 is a block diagram illustrating configurations of a communication apparatus and a portable apparatus according to a fourth embodiment of the present invention;

DETAILED DESCRIPTION OF THE PREFERRED EMBODIMENTS

Figure 2:
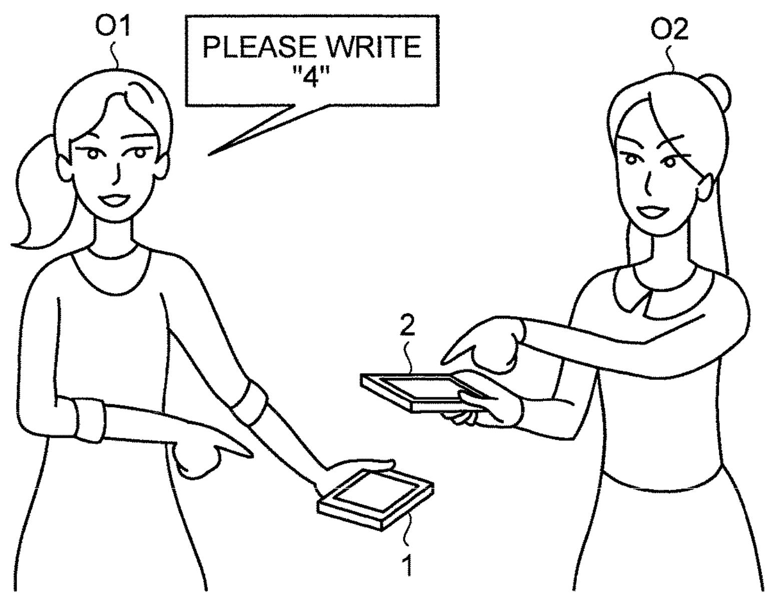
FIG. 2 is a diagram for describing an outline of a communication process executed by the communication apparatus and the portable apparatus according to the first embodiment of the present invention.

Exemplary embodiments of the present invention will be described with reference to the accompanying drawings. The present invention is not limited to the following embodiments. In the drawings, the same reference numerals are used to indicate the same or similar parts.

First Embodiment

FIG. 1 is a block diagram illustrating a configuration of a communication apparatus and a portable apparatus according to a first embodiment of the present invention. A communication apparatus 1 and a portable apparatus 2 illustrated in FIG. 1 are capable of performing two-way communication of content data including image data and audio data according to a specified wireless communication standard. Here, the example of the specified wireless communication standard include IEEE802.11b, IEEE802.11n, Bluetooth (a registered trademark), and infrared communication standard. In the first embodiment, any of the wireless communication standards can be applied.

First, the communication apparatus 1 will be described. The communication apparatus 1 includes an imaging apparatus such as a digital camera that images a specified field of view region and generates image data. The communication apparatus 1 includes an imaging unit 11, an input unit 12, a display unit 13, a touch panel 14, a recording unit 15, a transceiving unit 16, an audio input/output (I/O) unit 17, and a communication apparatus control unit 18.

The imaging unit 11 includes an optical system that is configured with one or more lenses and collects light from a specified field of view region, a diaphragm that adjust the incident amount of light collected by the optical system, a shutter that operates according to an input of a release signal, an imaging element of a charge coupled device (CCD) type or a complementary metal oxide semiconductor (CMOS) that receives light having passed the diaphragm and the shutter and converts the received light into an electric signal, and a signal processing unit that performs an analog process such as a noise reduction process and a gain-up process and A/D conversion on an analog signal output from the imaging element, and outputs the AD conversion result to the communication apparatus control unit 18.

The input unit 12 includes a power switch that receives an input an instruction signal for instructing power-on or power off of the communication apparatus 1, a release switch that receives an input of a release signal instructing the communication apparatus 1 to perform shooting, a selector switch that receives an input of a switching signal instructing switching of various modes of the communication apparatus, and an operating switch that receives an input of an operation signal for changing setting of various kinds of parameters of the communication apparatus 1.

The display unit 13 includes a display panel including a liquid crystal display (LCD) or an organic electro luminescence (EL) element. The display unit 13 displays an image corresponding to image data recorded in the recording unit 15. Here, examples of the image display includes a rec view display in which immediately captured image data is displayed during only a given period of time (for example, 3 seconds), a playback display in which image data recorded in the recording unit 15 is displayed, and a live view image display in which a live view image corresponding to image data consecutively generated by the imaging unit 11 is sequentially displayed in time series. Further, the display unit 13 appropriately displays operation information of the communication apparatus 1 and information related to shooting such as an exposure value and a diaphragm value.

The touch panel 14 is disposed on a display screen of the display unit 13. The touch panel 14 detects a touch of an external object, and outputs a positional signal corresponding to the detected touch position to the communication apparatus control unit 18. Further, the touch panel 14 may detect the position that the user touches based on information displayed on the display unit 13 and receive an input of an instruction signal instructing an operation to be performed by the communication apparatus 1 according to the detected touch position. Generally, as the touch panel 14, there are a resistive type touch panel, a capacitive type touch panel, an optical sensing type touch panel, and the like. In the first embodiment, a touch panel of any of the types can be applied.

The recording unit 15 includes a semiconductor memory such as a flash memory or a DRAM (Dynamic Random Access Memory). The recording unit 15 records various programs configured to operate the communication apparatus 1, various data or parameters used during execution of the programs, and the like. The recording unit 15 includes a setting information recording unit 151 that records setting information including identification information (an apparatus ID or a MAC address) of the communication apparatus 1 used to establish wireless communication with the portable apparatus 2 in response to a touch operation on the touch panel of the portable apparatus 2 and a password corresponding to the identification information, a content information recording unit 152 that records content data including image data or audio data generated by the imaging unit 11, and a signalizing information recording unit 153 that records signalizing information used when a position signal input from the touch panel 14 is converted into a specified numerical value. The recording unit 15 may have a function of a recording medium interface that records information in a recording medium such as a memory card mounted from the outside of the communication apparatus 1 and reads information recorded by the recording medium.

The transceiving unit 16 performs the wireless communication with the portable apparatus 2 in conformity with a specified wireless communication standard to transmit content data to the portable apparatus 2 and receives touch information on a touch pattern drawn on the touch panel of the portable apparatus 2. The transceiving unit 16 includes a communication device that performs the wireless communication with the portable apparatus 2 to perform bidirectional communication of the content data or various kinds of information. The communication device includes an antenna that transmits/receives a radio signal to/from another apparatus, a transceiving circuit that performs a demodulation process on the signal received by the antenna and performs a modulation process on a signal to be transmitted, and the like. The transceiving unit 16 transmits a communication signal including identification information (apparatus ID) notifying the presence thereof at regular intervals when the communication apparatus 1 starts up, receives a communication signal transmitted from the portable apparatus 2 or another apparatus, is recovered from a suspension state or a standby state, and establishes communication with the portable apparatus 2 or another apparatus. Further, the transceiving unit 16 may be installed in a recording medium such as a memory card mounted from the outside of the communication apparatus 1.

The audio I/O unit 17 includes a microphone, a speaker, and the like. The audio I/O unit 17 acquires audio data, and outputs the acquired audio data to the communication apparatus control unit 18. The audio I/O unit 17 plays back and outputs audio data of content data recorded in the recording unit 15.

The communication apparatus control unit 18 includes a central processing unit (CPU) and the like. The communication apparatus control unit 18 controls an operation of the communication apparatus 1 in general by giving a corresponding instruction or transferring data to the components configuring the communication apparatus 1 according to an instruction signal, a switching signal, or the like from the input unit 12 or the touch panel 14. The communication apparatus control unit 18 sets setting information that includes identification information of the portable apparatus 2, a password corresponding to the identification information, and touch information on a touch pattern to be drawn on the touch panel of the portable apparatus 2 to establish the wireless communication with the portable apparatus 2. When the touch information is compared with the touch information received from the portable apparatus 2 and is identical with the touch information, the communication apparatus control unit 18 establishes the wireless communication between the portable apparatus 2 and the communication apparatus 1 and transmits content data to the portable apparatus 2.

The detailed configuration of the communication apparatus control unit 18 will be described. The communication apparatus control unit 18 includes an image processing unit 181, a signalizing unit 182, a setting unit 183, a pattern determining unit 184, a transmission control unit 185, and a display control unit 186.

The image processing unit 181 includes an image engine (an image controller), and executes various kinds of image processing on image data input from the imaging unit 11 and outputs the image processing result to the recording unit 15 or the display unit 13. The image processing unit 181 performs image processing including at least a gain process of adjusting brightness of an image, a gradation correction process of correcting a gradation, an edge process, a white balance process, a color correction process, and a $\gamma$ correction process on image data. The image processing unit 181 may compress image data according to the Joint Photographic Experts Group (JPEG) scheme and then causes the compressed image data to be recorded in the recording unit 15.

The signalizing unit 182 converts a position signal continuously input from the touch panel 14 into numerical values with reference to the signalizing information recorded by the signalizing information recording unit 153. Specifically, the signalizing unit 182 converts a touch pattern or a trajectory of the touch panel 14 by the user into numerical values (data).

The setting unit 183 sets setting information including touch information regarding a touch pattern to be drawn on the touch panel of the portable apparatus 2. Specifically, the setting unit 183 sets, as the setting information, the touch information in which the numerical values into which the signalizing unit 182 converts the trajectory of the touch panel 14 by the user are the password of the communication apparatus 1 to establish the wireless communication with the portable apparatus 2. The setting unit 183 records the touch information on the setting information recording unit 151. Here, the touch pattern includes a touch pattern of a slide operation on the touch panel 14 by the user, a touch pattern of a pinch operation, and a touch pattern of a touch operation.

The pattern determining unit 184 compares an operation pattern of the touch information transmitted from the portable apparatus 2 via the transceiving unit 16 to an operation pattern of the touch information set by the setting unit 183 to determine whether these operation patterns are identical with each other.

When the touch information received by the transceiving unit 16 is identical with the touch information set by the setting unit 183, the transmission control unit 185 establishes the wireless communication between the portable apparatus 2 and the communication apparatus 1 and causes the transceiving unit 16 to transmit the content data to the portable apparatus 2. Specifically, when the pattern determining unit 184 determines that the touch information received by the transceiving unit 16 is identical with the touch information set by the setting unit 183, the transmission control unit 185 transmits the content data to the portable apparatus 2.

The display control unit 186 causes the display unit 13 to display an image corresponding to the image data. The display control unit 186 causes the display unit 13 to display a character or a trajectory drawn on the touch panel 14 by the user based on the position signal input from the touch panel 14. For example, when the user draws "4" on the touch panel 14, the display control unit 186 causes the display unit 13 to display "4" corresponding to the trajectory of the user. Further, the display control unit 186 may cause the display unit 13 to display the setting information recorded by the setting information recording unit 151.

The communication apparatus 1 having the above configuration may have a communication function capable of performing two-way communication with a personal computer (not illustrated) via the Internet.

Next, the portable apparatus 2 will be described. The portable apparatus 2 includes a multi-functional mobile phone that performs two-way wireless communication with a network or an external communication station. The portable apparatus 2 includes an imaging unit 21, a transceiving unit 22, an audio I/O unit 23, a geomagnetic detecting unit 24, an input unit 25, a display unit 26, a touch panel 27, a recording unit 28, a communication unit 29, and a portable control unit 30. The imaging unit 21, the transceiving unit 22, the audio I/O unit 23, the input unit 25, the display unit 26, and the touch panel 27 have the same configurations as the imaging unit 11, the transceiving unit 16, the audio I/O unit 17, the input unit 12, the display unit 13 and the touch panel 14 of the communication apparatus 1, respectively, and thus a description thereof will not be made.

The geomagnetic detecting unit 24 includes a magnetic director sensor, and detects a designated direction which is set to the portable apparatus 2 in advance. Specifically, the geomagnetic detecting unit 24 detects a direction of the portable apparatus 2 when an upward direction from the center of a display screen of the display unit 26 is used as a reference direction by detecting geomagnetic components in the vertical direction and the horizontal direction when the display unit 26 is in the horizontal state.

The recording unit 28 includes a semiconductor memory such as a flash memory or a DRAM. The recording unit 28 records various kinds of programs of operating the communication apparatus 1 and various kinds of data and parameters used during execution of a program. The recording unit 28 includes a setting information recording unit 281 that records setting information including identification information of the communication apparatus 1 necessary to perform the wireless communication with the communication apparatus 1 and a password corresponding to the identification information, a content information recording unit 282 that records the content data, and a signalizing information recording unit 283 that records the signalizing information used when the position signal input from the touch panel 27 is converted into a specified numerical value.

The communication unit 29 is a communication interface for performing two-way communication with an external apparatus such as another portable apparatus or a personal computer via a network.

The portable control unit 30 includes a CPU or the like. The portable control unit 30 controls an operation of the portable apparatus 2 in general by giving a corresponding instruction or transferring data to the components configuring the portable apparatus 2 according to an instruction signal, a switching signal, or the like from the input unit 25 or the touch panel 27.

The detailed configuration of the portable control unit 30 will be described. The portable control unit 30 includes an image processing unit 301, a signalizing unit 302, a setting unit 303, a pattern determining unit 304, a transmission control unit 305, and a display control unit 306. The portable control unit 30 sets setting information that includes identification information of the communication apparatus 1, a password corresponding to the identification information, and touch information on a touch pattern to be drawn on the touch panel 14 of the communication apparatus 1 to establish the wireless communication with the communication apparatus 1. When the touch information is compared with the touch information received from the communication apparatus 1 and is identical with the touch information, the portable control unit 30 establishes the wireless communication between the portable apparatus 2 and the communication apparatus 1 and transmits the content data to the communication apparatus 1.

The image processing unit 301 includes an image engine, and executes various kinds of image processing on image data input from the imaging unit 21 and outputs the image processing result to the recording unit 28 or the display unit 26. The image processing unit 301 performs image processing including at least a gain process of adjusting brightness of an image, a gradation correction process of correcting a gradation, an edge process, a white balance process, a color correction process, and a γ correction process on image data. The image processing unit 301 may compress image data according to the JPEG scheme and then causes the compressed image data to be recorded in the recording unit 28.

The signalizing unit 302 converts a position signal continuously input from the touch panel 27 into numerical values with reference to the signalizing information recorded by the signalizing information recording unit 283. The position signal continuously input from the touch panel 27 is converted into numerical values with reference to the signalizing information recorded by the signalizing information recording unit 283. Specifically, the signalizing unit 302 converts a trajectory of the touch panel 27 by the user into numerical values (data).

The setting unit 303 sets touch information regarding a touch pattern to be drawn on the touch panel 14 of the communication apparatus 1 to establish the wireless communication with the communication apparatus 1.

The pattern determining unit 304 determines whether the touch information transmitted from the communication apparatus 1 via the transceiving unit 22 is identical with the touch information set by the setting unit 303.

When the touch information received by the transceiving unit 22 is identical with the touch information set by the setting unit 303, the transmission control unit 305 establishes the wireless communication between the communication apparatus 1 and the portable apparatus 2 and causes the transceiving unit 22 to transmit the content data to the communication apparatus 1.

The display control unit 306 causes the display unit 26 to display an image corresponding to the image data. The display control unit 306 causes the display unit 26 to display a character or a trajectory drawn on the touch panel 27 by the user based on the position signal input from the touch panel 27. Further, the display control unit 306 may cause the display unit 26 to display the setting information recorded by the setting information recording unit 281.

The portable apparatus 2 having the above configuration may have a flash mechanism that irradiates fill light toward a specified field of view region.

Figure 3:
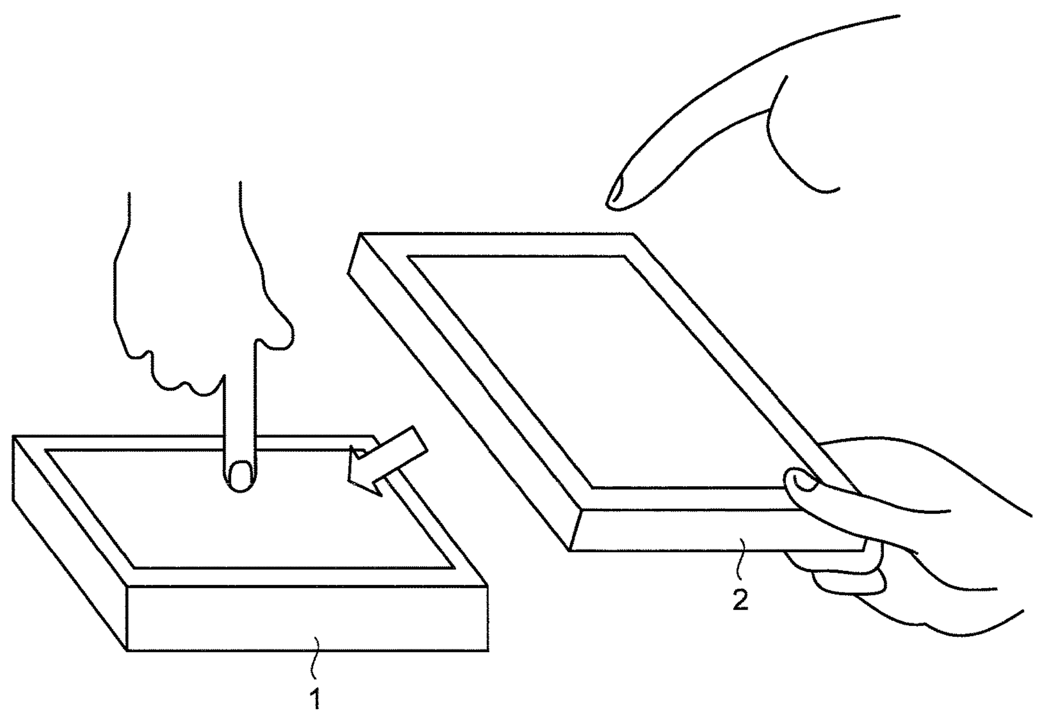
FIG. 3 is a diagram for schematically describing a state of FIG. 2.

FIG. 2 is a diagram for describing an outline of a communication process executed by the communication apparatus 1 and the portable apparatus 2. FIG. 3 is a diagram for schematically describing a state of FIG. 2. In FIGS. 2 and 3, the communication apparatus 1 is set to be in a playback mode in which the content data recorded on the recording unit 15 is played back and displayed, and the portable apparatus 2 is set to be in a reception mode in which the content data is received from the communication apparatus 1.

As illustrated in FIG. 2, when the communication apparatus 1 performs the wireless communication with the portable apparatus 2 in conformity with a specified wireless communication standard and transmits the content data, the communication apparatus 1 receives the touch information converted in response to a touch operation on the touch panel 27 from the portable apparatus 2. When the touch information is identical with the touch information set by the setting unit 183, the communication apparatus 1 establishes the wireless communication with the portable apparatus 2 and transmits the content data. For example, as illustrated in FIGS. 2 and 3, when a user O1 tells a user O2 that the user O2 draws “4” with the portable apparatus 2 and the user O2 draws “4” on the touch panel 27 of the portable apparatus 2, the communication apparatus 1 receives the touch information converted according to a trajectory which is drawn on the touch panel 27 of the portable apparatus 2 and is transmitted from the portable apparatus 2. When the touch information is identical with the touch information set by the setting unit 183, the communication apparatus 1 establishes the wireless communication with the portable apparatus 2 and transmits the content data.

A technology for establishing the communication is generally realized by performing negotiation by selection of identification information (apparatus ID) and reply of a password corresponding to the identification information. However, in the first embodiment, the above-described communication establishment may be performed when setting the password used to establish the wireless communication after the selection of the identification information (apparatus ID). That is, both (one-to-many) users operate a simple operation (here, a touch operation or a specific operation) for an instant password to perform authentication based on a contract agreed directly between persons. Since the communication apparatus 1 or the portable apparatus 2 convert this operation into a stipulated password rule such as a character string according to a specific determination method, various communication standards can be conformed to. At this time, since operation authentication is entered after an operation of selecting the identification information (apparatus ID), security can be improved and spoofing or the like can be prevented.

Figure 4A:
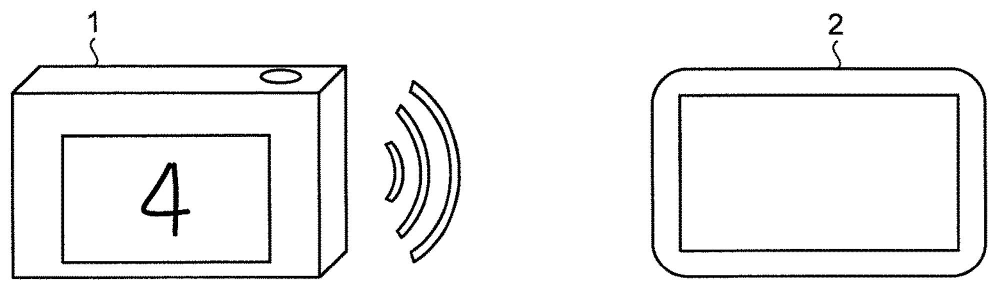
FIGS. 4A to 4C are diagrams illustrating statuses when the communication apparatus and the portable apparatus according to the first embodiment of the invention establish wireless communication.
Figure 4B:
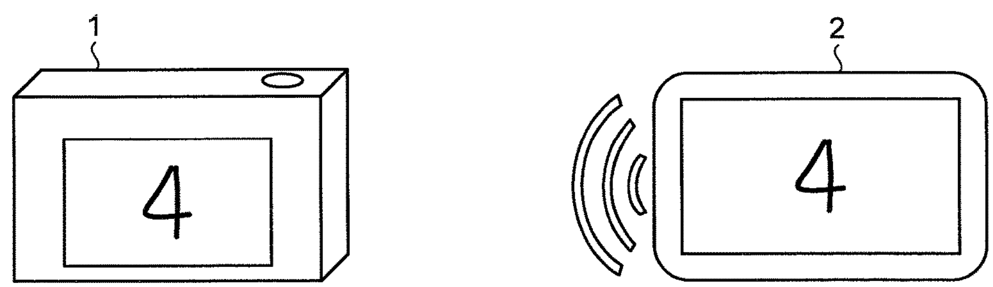
Figure 4C:
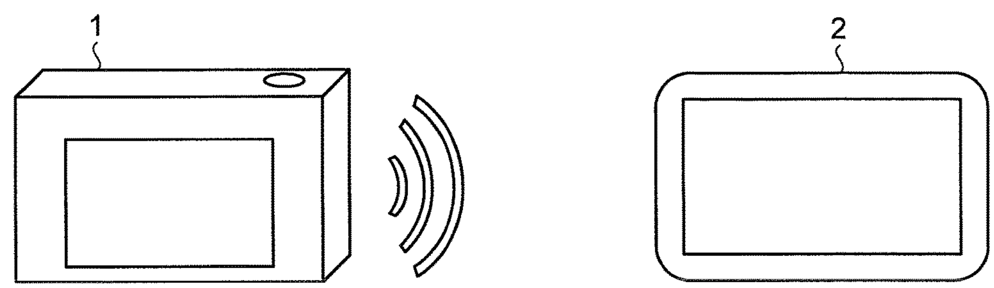

FIGS. 4A to 4C are diagrams illustrating a status when the wireless communication is established between the communication apparatus 1 and the portable apparatus 2.

As illustrated in FIGS. 4A to 4C, in the communication apparatus 1, first, the transmission control unit 185 causes the transceiving unit 16 to transmit the identification information of the communication apparatus 1 included in the setting information to the portable apparatus 2 and the setting unit 183 sets the touch information which is a password used to establish the wireless communication with the portable apparatus 2 (FIG. 4A). Specifically, the transmission control unit 185 transmits the identification information (apparatus ID) of the communication apparatus 1 to an external apparatus such as the portable apparatus 2 present within a specified area. The setting unit 183 sets a trajectory of the touch panel 14 by the user as the touch information used to establish the wireless communication with the portable apparatus 2 and records the set touch information in correspondence with the setting information of the communication apparatus 1 recorded by the setting information recording unit 151. At this time, the signalizing unit 182 converts the trajectory of the touch panel 14 by the user into the numerical values and records the numerical values in the setting information recording unit 151.

Subsequently, the portable apparatus 2 transmits the numerical values into which the signalizing unit 302 converts the trajectory of the touch panel 27 by the user as the touch information to the communication apparatus 1 (FIG. 4B).

FIG. 5 is a diagram illustrating an overview of a method by which the signalizing unit 302 converts the trajectory of the touch panel 27 by the user into the numerical values. As illustrated in FIG. 5, the signalizing unit 302 converts the trajectory of the touch panel 27 by the user into the numeral based on a signalizing information table T1 recorded by the signalizing information recording unit 283 and a position signal input from the touch panel 27. For example, the signalizing unit 302 performs numerical conversion (data conversion) of a character drawn on the touch panel 27 by the user based on a touch start position (upper and lower), a touch start position (right and left), an initial slide (first-half), an initial slide (second-half), and the like of the touch panel 27 by the user. Specifically, when the user draws “4” on the touch panel 27 and the touch start position of the touch panel 27 by the user is ²⁄₄ from the upper side and is in the midst, the signalizing unit 302 converts the character into “03” and “01.” Further, when the initial side (first-half) is the lower left direction and there is no initial slide (second-half), the signalizing unit 302 converts the character into “05” and “01.” Thereafter, the signalizing unit 302 converts the character corresponding to the trajectory of the touch panel 27 by the user into a numeral with reference to the signalizing information table T1.

Thereafter, when the touch information received from the portable apparatus 2 is identical with the touch information set by the setting unit 183, the transmission control unit 185 establishes the wireless communication with the portable apparatus 2 and transmits the content data to the portable apparatus 2. Specifically, when the operation pattern (numerical value) of the touch information received from the portable apparatus 2 is identical with the operation pattern (numerical value) of the touch information set by the setting unit 183, the transmission control unit 185 establishes the wireless communication with the portable apparatus 2 and transmits the content data to the portable apparatus 2 (FIG. 4C).

Thus, the user O2 of the portable apparatus 2 can establish the wireless communication with the communication apparatus 1 and receive the content data using the portable apparatus 2 merely by performing an operation designated by the user of the communication apparatus 1 on the touch panel 27 of the portable apparatus 2. Therefore, the wireless communication can be established through the simple operation and security is superior.

Figure 6:
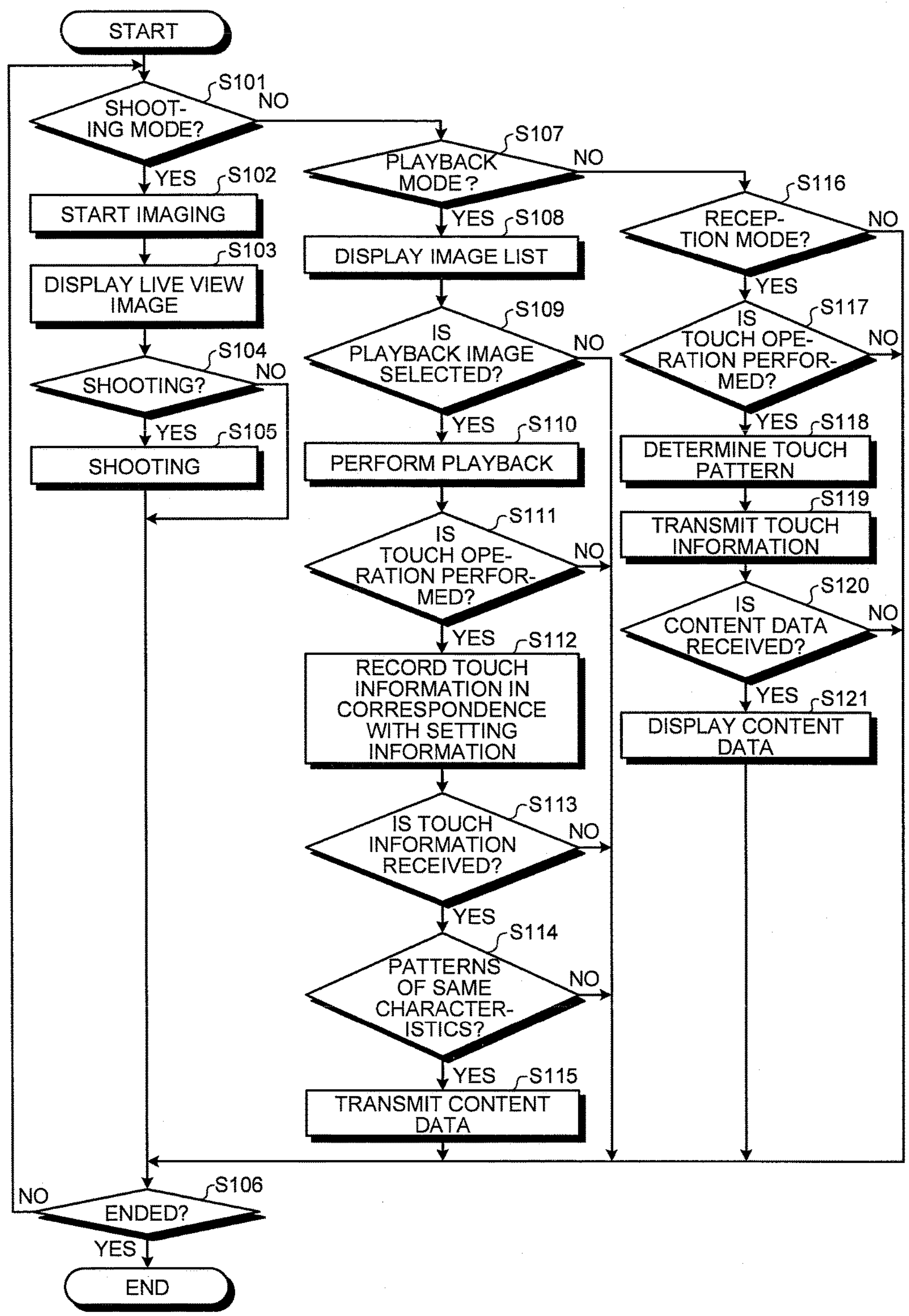
FIG. 6 is a flowchart illustrating an outline of a process executed by the communication apparatus according to the first embodiment of the present invention.

Next, an outline of a process executed by the communication apparatus 1 will be described. FIG. 6 is a flowchart illustrating an outline of a process executed by the communication apparatus 1. The same process as in the flowchart illustrated in FIG. 6 may be performed by the portable apparatus 2.

The description will proceed in connection with an example in which the communication apparatus 1 is set to the shooting mode (Yes in step S101) as illustrated in FIG. 6. In this case, the communication apparatus 1 starts imaging (step S102), the display control unit 186 causes a live view image imaged by the imaging unit 11 to be displayed on the display unit 13 (step S103).

Subsequently, when it is determined that a release signal has been input through the input unit 12 (Yes in step S104), the communication apparatus 1 executes shooting (step S105). Specifically, the communication apparatus 1 performs a process of generating image data to be generated by causing the imaging unit 11 to execute the shooting operation, causing the image processing unit 181 to execute image processing on the image data, and recording the image processing result in the recording unit 15. However, when it is determined that the release signal has not been input through the input unit 12 (No in step S104), the communication apparatus 1 causes the process to proceed to step S106.

Thereafter, the communication apparatus control unit 18 determines whether an imaging process or a playback process of the communication apparatus 1 ends, when the power of the communication apparatus 1 enters the OFF state or the communication apparatus 1 enters a standby state (step S106). When the communication apparatus control unit 18 determines that the imaging process or the playback process of the communication apparatus 1 ends (Yes in step S106), the communication apparatus 1 ends the process. Conversely, when the communication apparatus control unit 18 determines that the imaging process or the playback process of the communication apparatus 1 does not end (No in step S106), the communication apparatus 1 causes the process to return to step S101.

Next, an example in which the communication apparatus 1 is not set to the shooting mode (No in step S101) but the communication apparatus 1 is set to the playback mode (Yes in step S107) will be described. In this case, the display control unit 186 causes images (thumbnail images) respectively corresponding a plurality of pieces of image data recorded by the recording unit 15 to be listed and displayed on the display unit 13 (step S108).

Then, when a playback image to be enlarged and played back is selected from the list of the displayed images (Yes in step S109), the display control unit 186 enlarges and plays back the selected image (step S110). Conversely, when the playback image expanded and played back is not selected from an image displayed in a list within a given time (No in step S109), the communication apparatus 1 causes the process to proceed to step S106.

In step S111, the communication apparatus control unit 18 determines whether a touch operation is performed on the touch panel 14. Specifically, the communication apparatus control unit 18 determines whether the position signal is input from the touch panel 14. When the communication apparatus control unit 18 determines that the touch operation is performed on the touch panel 14 (Yes in step S111), the communication apparatus 1 causes the process to proceed to step S112 to be described below. Conversely, when the communication apparatus control unit 18 determines that the touch operation is not performed on the touch panel 14 (No in step S111), the communication apparatus 1 causes the process to proceed to step S106.

In step S112, the setting unit 183 records the setting information of the communication apparatus 1 recorded by the setting information recording unit 151 and the touch information used to establish the wireless communication with the portable apparatus 2 according to the touch operation on the touch panel 14 by the user in correspondence therewith in the setting information recording unit 151. At this time, the setting unit 183 may record the numerical values into which the touch operation is converted by the signalizing unit 182 as the touch information in correspondence with the setting information of the communication apparatus 1 in the setting information recording unit 151.

Subsequently, the communication apparatus control unit 18 determines whether the transceiving unit 16 receives the touch information performed on the touch panel 27 of the portable apparatus 2 (step S113). When the communication apparatus control unit 18 determines that the transceiving unit 16 receives the touch information performed on the touch panel 27 of the portable apparatus 2 (Yes in step S113), the communication apparatus 1 causes the process to proceed to step S114. Conversely, when the communication apparatus control unit 18 determines that the transceiving unit 16 does not receive the touch information performed on the touch panel 27 of the portable apparatus 2 (No in step S113), the communication apparatus 1 causes the process to proceed to step S106.

Subsequently, the pattern determining unit 184 determines whether the operation pattern of the touch information received by the transceiving unit 16 is identical with the operation pattern of the touch information recorded by the setting information recording unit 151 (step S114). When the pattern determining unit 184 determines that the operation pattern of the touch information received by the transceiving unit 16 is identical with the operation pattern of the touch information recorded by the setting information recording unit 151 (Yes in step S114), the transmission control unit 185 causes the transceiving unit 16 to transmit the content data to the portable apparatus 2 (step S115). Thereafter, the communication apparatus 1 causes the process to proceed to step S106.

When the pattern determining unit 184 determines that the operation pattern of the touch information received by the transceiving unit 16 is not identical with the operation pattern of the touch information recorded by the setting information recording unit 151 in step S114 (No in step S114), the communication apparatus 1 causes the process to proceed to step S106. At this time, the display control unit 186 may cause the display unit 13 to display a warning indicating that the operation patterns are different.

Next, a case will be described in which the playback mode is not set in step S107 (No in step S107) and the reception mode is set (Yes in step S116). In this case, the communication apparatus control unit 18 determines whether the touch operation is performed on the touch panel 14 (step S117). When the communication apparatus control unit 18 determines that the touch operation is performed on the touch panel 14 (Yes in step S117), the communication apparatus 1 causes the process to proceed to step S118. Conversely, when the communication apparatus control unit 18 determines that the touch operation is not performed on the touch panel 14 (No in step S117), the communication apparatus 1 causes the process to proceed to step S106.

In step S118, the signalizing unit 182 determines the trajectory of the touch panel 14 by the user. At this time, the signalizing unit 182 converts the trajectory of the touch panel 14 by the user into the numerical values as the touch information. The trajectory of the touch panel operation by the user can be said to be a "trajectory of the touch" or the temporal change information of the touch position. Subsequently, the transmission control unit 185 causes the transceiving unit 16 to transmit the numerical values converted by the signalizing unit 182 as the touch information to the portable apparatus 2 (step S119).

Thereafter, the communication apparatus control unit 18 determines whether the content data is received from the portable apparatus 2 (step S120). When the communication apparatus control unit 18 determines that the content data is received from the portable apparatus 2 (Yes in step S120), the communication apparatus 1 causes the process to proceed to step S121. Conversely, when the communication apparatus control unit 18 determines that the content data is not received from the portable apparatus 2 (No in step S120), the communication apparatus 1 causes the process to proceed to step S106. At this time, when the communication apparatus 1 does not receive the content data within the given time from the portable apparatus 2, the display control unit 186 may cause the display unit 13 to display a warning indicating that the content data may not be received.

In step S121, the display control unit 186 causes the display unit 13 to display an image corresponding to the content data received from the portable apparatus 2. When the content data received from the portable apparatus 2 is audio data, the communication apparatus control unit 18 causes the audio I/O unit 17 to play back the audio data. Thereafter, the communication apparatus 1 causes the process to proceed to step S106.

When the communication apparatus 1 is not set to the reception mode in step S116 (No in step S116), the communication apparatus 1 causes the process to proceed to step S106.

In the first embodiment of the invention described above, when the touch information received by the transceiving unit 16 is identical with the touch information set by the setting unit 183, the transmission control unit 185 establishes the wireless communication between the portable apparatus 2 and the communication apparatus 1 and causes the transceiving unit 16 to transmit the content data to the portable apparatus 2. Thus, the security is excellent, and it is possible to perform two-way wireless communication with another external apparatus by an easy operation.

Further, according to the first embodiment, the present invention can be simply applied to communication establishment based on an apparatus ID (identification information) and a password used in many communication standards, an ID of an apparatus can be simply acquired, a password used to transmit content data can be freely set by a promise of a place between users, and the security can be increased.

In the first embodiment, since the degree of freedom of the process for the communication establishment on the touch panel 14 or the touch panel 27 is improved and a variety of simple processes are changed or increased at that place to select a process suitable for a situation. Accordingly, the process of establishing the wireless communication can be considerably simplified and security can be improved.

In the first embodiment, the identification information (apparatus ID) can be substituted with a sign or a character obtainable through the touch operation. That is, when the first half of the pattern written by the transmitting side is set as a portion configured to set the apparatus ID and the second half of the pattern is determined to serve as the password, various communication standards can be likewise conformed to. Therefore, when many apparatuses are communication candidates, the process of selecting an apparatus with which the communication is desired to be performed can be omitted, and thus the communication establishment can be performed through a simpler process. The communication establishment can be selected to various degrees of freedom according to the communication at the place, and thus the security can be improved. The degrees of freedom can be considerably varied by a procedure in which a finger or the like is moved in the two-dimensional space of the touch panel 14.

In the first embodiment, since a process such as a touch or a slide on the touch panel 14 is a process performed on the panel with a restricted area, anyone can simply perform an operation. Since communication both (or plural) sides imitate a motion of a finger or the like watching at the place, the communication both (or plural) sides may imitate a favorite sign, scribble, or the like as well as a character. Since an operation can be performed in a sense to write a character or a sense to draw a picture, a friendly operation common to humans can be performed, and thus the difficulty level of a difficult communication establishment method can be decreased. The trajectory of the touch panel operation performed by the user can be said to be a "trajectory of a touch" or the temporal change information of a touch position. When a specific character or picture is drawn by touch, the trajectory can be said to be drawing information by the touch. In a case of a character, either user does not need to input a touch.

In the first embodiment, a technique can be realized in a sense to make an attempt even for a user who has no confidence of communication. That is, the user can overcome a psychological hurdle and the use can be also promoted.

In the first embodiment, the setting unit 183 and the setting unit 303 record the touch information as the password on the setting information recording unit 151 or the setting information recording unit 281, respectively. However, the touch information may not be recorded every time. In this case, the setting unit 183 or the setting unit 303 may set the touch information, while the user presses the input unit 12, for example, only when the user maintains a pressing state of a switch such as an operation switch or an operation dial. Thus, the security can be further improved.

Second Embodiment

Next, a second embodiment of the invention will be described. A communication apparatus and a portable apparatus according to the second embodiment have the same configuration as those of the above-described embodiment. Touch information as a password and a process are different when content data is transmitted and received. Therefore, processes performed by the communication apparatus and the portable apparatus according to the second embodiment will be described below, after the touch information is described as the password when the communication apparatus and the portable apparatus according to the second embodiment transmit and receive the content data. The same reference numerals are given to units having the same configurations as those of the first embodiment described above to make the description.

Figure 7:
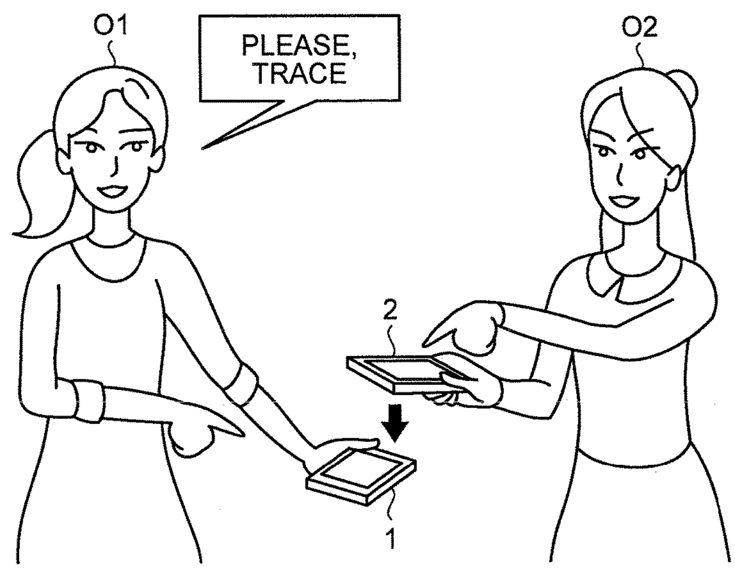
FIG. 7 is a diagram for describing an outline of a communication process executed by a communication apparatus and a portable apparatus according to a second embodiment of the present invention.
Figure 8:
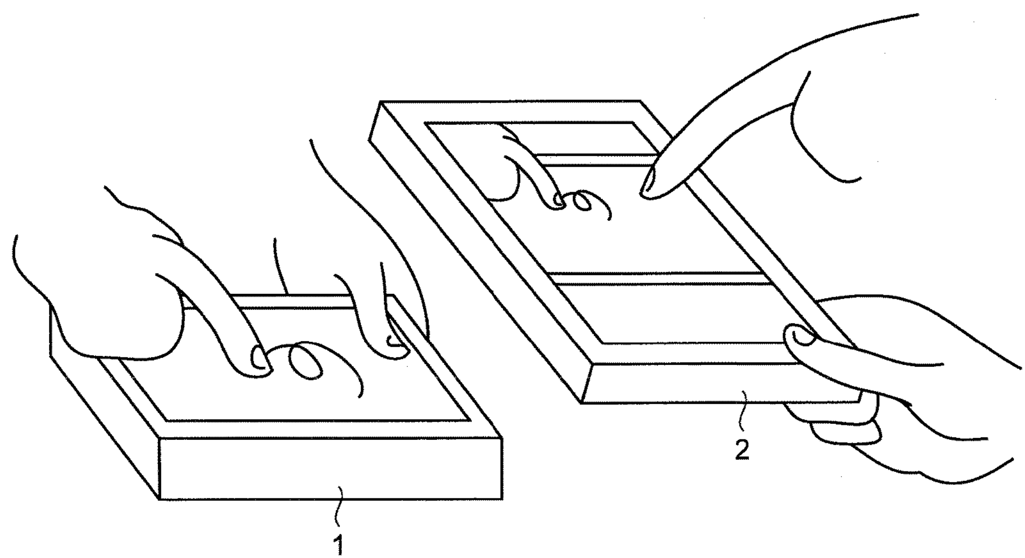
FIG. 8 is a diagram for schematically describing a state of FIG. 7.

FIG. 7 is a diagram illustrating the overview of a communication process performed by a communication apparatus 1 and a portable apparatus 2. FIG. 8 is a diagram schematically illustrating a status of FIG. 7. In FIGS. 7 and 8, the communication apparatus 1 is set to a playback mode and the portable apparatus 2 is set to a shooting mode.

As illustrated in FIGS. 7 and 8, when the communication apparatus 1 performs the wireless communication with the portable apparatus 2 and transmits the content data in conformity with a specified wireless communication standard, the portable apparatus 2 continuously images the display unit 13 of the communication apparatus 1 and receives the touch information on an operation which is substantially the same as the trajectory of the touch panel 14 of the user shown in a live view image displayed on the display unit 26 of the portable apparatus 2. When the touch information is identical with the touch information set by the setting unit 183, the portable apparatus 2 transmits the content data. For example, as illustrated in FIGS. 7 and 8, when the user O1 tells the user O2 that the user O2 traces a motion and the user O2 images the communication apparatus 1 using the portable apparatus 2 and performs the same trajectory as the trajectory performed on the touch panel 14 of the communication apparatus 1 by the user O1 on the touch panel 27 of the portable apparatus 2, while viewing the live view image displayed on the display unit 26 of the portable apparatus 2, the communication apparatus 1 establishes the wireless communication with the portable apparatus 2 and transmits the content data.

Thus, the user O2 of the portable apparatus 2 can receive the content data using the portable apparatus 2 merely by tracing the same motion as the trajectory performed on the touch panel 14 by the user O1 and displayed by the display unit 26 of the portable apparatus 2 on the touch panel 27 of the portable apparatus 2, while imaging the trajectory of the touch panel 14 by the user O1 using the portable apparatus 2.

Figure 9:
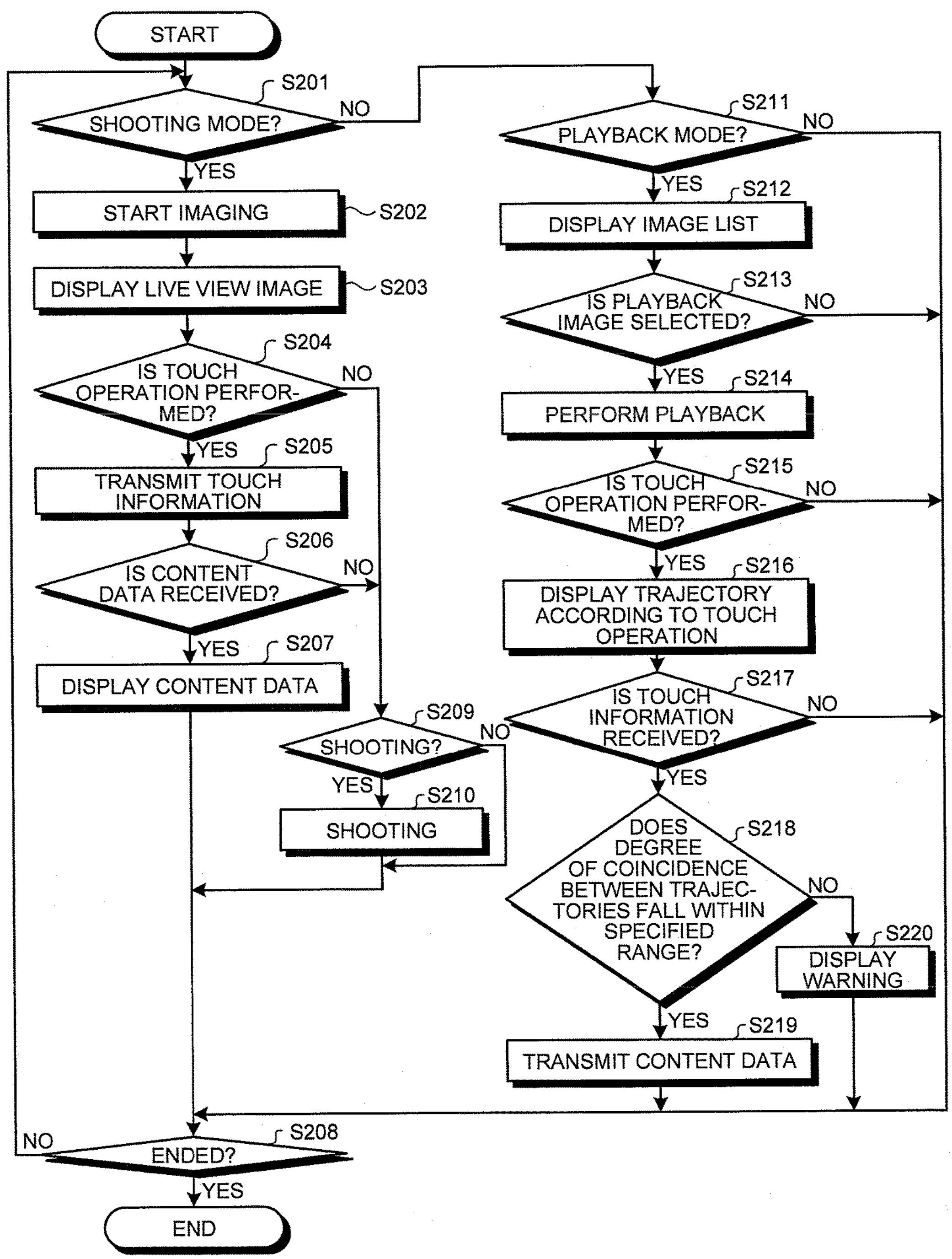
FIG. 9 is a flowchart illustrating the overview of a process performed by the communication apparatus according to the second embodiment of the present invention.

Next, the overview of a process performed by the communication apparatus 1 will be described. FIG. 9 is a flowchart illustrating the overview of the process performed by the communication apparatus 1. The flowchart illustrated in FIG. 9 can be also performed likewise by the portable apparatus 2.

Steps S201 to S203 correspond to steps S101 to S103 of FIG. 6, respectively.

In step S204, the communication apparatus control unit 18 determines whether a touch operation is performed on the touch panel 14. When the communication apparatus control unit 18 determines that the touch operation is performed on the touch panel 14 (Yes in step S204), the communication apparatus 1 causes the process to proceed to step S205 to be described below. Conversely, when the communication apparatus control unit 18 determines that the touch operation is not performed on the touch panel 14 (No in step S204), the communication apparatus 1 causes the process to proceed to step S209 to be described below.

In step S205, the transmission control unit 185 transmits the trajectory of the touch panel 14 by the user as touch information to the portable apparatus 2.

Subsequently, the communication apparatus control unit 18 determines whether the content data is received from the portable apparatus 2 (step S206). When the communication apparatus control unit 18 determines that the content data is received from the portable apparatus 2 (Yes in step S206), the display control unit 186 causes the display unit 13 to display the content data received from the portable apparatus 2 (step S207).

Thereafter, the communication apparatus control unit 18 determines whether an imaging process or a playback process of the communication apparatus 1 ends, when the power of the communication apparatus 1 enters the OFF state or the communication apparatus 1 enters a standby state (step S208). When the communication apparatus control unit 18 determines that the imaging process or the playback process of the communication apparatus 1 ends (Yes in step S208), the communication apparatus 1 ends the process. Conversely, when the communication apparatus control unit 18 determines that the imaging process or the playback process of the communication apparatus 1 does not end (No in step S208), the communication apparatus 1 causes the process to return to step S201.

When the communication apparatus control unit 18 determines that the content data is not received from the portable apparatus 2 in step S206 (No in step S206), the communication apparatus 1 causes the process to proceed to step S209.

Step S209 and step S210 correspond to step S104 and step S105 of FIG. 6, respectively. Further, step S211 to step S215 correspond to step S107 to step S111 of FIG. 6, respectively.

In step S216, the display control unit 186 causes the display unit 13 to display the trajectory according to the touch operation of the touch panel 14 by the user. Specifically, as illustrated in FIG. 8, the display control unit 186 causes the display unit 13 to display the trajectory of the touch panel 14 by the user based on the position signals continuously input from the touch panel 14.

Subsequently, the communication apparatus control unit 18 determines whether the transceiving unit 16 receives the touch information from the portable apparatus 2 (step S217). When the communication apparatus control unit 18 determines that the transceiving unit 16 receives the touch information from the portable apparatus 2 (Yes in step S217), the communication apparatus 1 causes the process to proceed to step S218 to be described below. Conversely, when the communication apparatus control unit 18 determines that the transceiving unit 16 does not receive the touch information from the portable apparatus 2 (No in step S217), the communication apparatus 1 causes the process to proceed to step S208.

In step S218, the pattern determining unit 184 determines whether the degree of coincidence between the trajectory of the touch panel 27 of the portable apparatus 2 included in the pattern information received by the transceiving unit 16 and the trajectory of the touch panel 14 set by the setting unit 183 of the communication apparatus 1 falls within a specified range. When the pattern determining unit 184 determines that the degree of coincidence between the trajectory of the touch panel 14 of the portable apparatus 2 included in the touch information received by the transceiving unit 16 and the trajectory of the touch panel 14 set by the setting unit 183 of the communication apparatus 1 falls within a specified range (Yes in step S218), the transmission control unit 185 causes the transceiving unit 16 to transmit the content data to the portable apparatus 2 (step S219). Thereafter, the communication apparatus 1 causes the process to proceed to step S208.

When the pattern determining unit 184 determines that the degree of coincidence between the trajectory of the touch panel 14 of the portable apparatus 2 included in the touch information received by the transceiving unit 16 and the trajectory of the touch panel 14 set by the setting unit 183 of the communication apparatus 1 does not fall within the specified range in step S218 (No in step S218), the display control unit 186 causes the display unit 13 to display a warning indicating that the trajectory of the touch operation performed on the touch panel 27 of the portable apparatus 2 by the user does not coincide with the trajectory of the touch operation performed on the touch panel 14 of the communication apparatus 1 (step S220). Thereafter, the communication apparatus 1 causes the process to proceed to step S208.

In the above-described second embodiment of the invention, when the trajectory of the touch information received by the transceiving unit 16 coincides with the trajectory of the touch information set by the setting unit 183, the transmission control unit 185 establishes the wireless communication between the portable apparatus 2 and the communication apparatus 1 and causes the transceiving unit 16 to transmit the content data to the portable apparatus 2. Thus, the security can be superior and the bidirectional wireless communication with the portable apparatus 2 can be performed through a simple operation.

In the second embodiment, since the display control unit 186 causes the display unit 13 to display the trajectory of the touch panel 14 by the user in an identifiable manner, the imaging can be continuously performed with the portable apparatus 2 receiving the content data and the trajectory of the touch panel 14 in the live view image displayed by the display unit 26 can be easily traced. Thus, the bidirectional wireless communication can be established through a simpler operation with the portable apparatus 2 and the content data can be transmitted and received.

In the second embodiment, the identification information (apparatus ID) may be also substituted with a sign or a character obtainable through the touch operation. That is, when the first half of the pattern written by the transmitting side is set as a portion configured to set the apparatus ID and the second half of the pattern is determined to serve as the password, various communication standards can be likewise conformed to. Therefore, when many apparatuses are communication candidates, the process of selecting an apparatus with which the communication is desired to be performed can be omitted, and thus the communication establishment can be performed through a simpler process. The communication establishment can be selected to various degrees of freedom according to the communication at the place, and thus the security can be improved. The degrees of freedom can be considerably varied by a procedure in which a finger or the like is moved in the two-dimensional space of the touch panel 14.

In the second embodiment, since a process such as a touch or a slide on the touch panel 14 is a process performed on the panel with a restricted area, anyone can simply perform an operation. Since both (or plural) communication sides imitate a motion of a finger or the like watching at the place, the communication both (or plural) sides may imitate a favorite sign, scribble, or the like as well as a character. Since an operation can be performed in a sense to write a character or a sense to draw a picture, a friendly operation common to humans can be performed, and thus the difficulty level of a difficult communication establishment method can be decreased.

In the second embodiment, a technique can be realized in a sense to make an attempt even for a user who has no confidence of communication. That is, the user can overcome a psychological hurdle and the use can be also promoted.

Third Embodiment

Next, a third embodiment of the invention will be described. In the third embodiment, wireless communication is established and content data is transmitted, when characters drawn on touch panels of a communication apparatus and a portable apparatus through touch operations are identical with each other. Therefore, processes performed by the communication apparatus and the portable apparatus according to the third embodiment will be described below, after the configurations of the communication apparatus and the portable apparatus according to the third embodiment are described. The same reference numerals are given to units having the same configurations as those of the first embodiment described above to make the description.

FIG. 10 is a block diagram illustrating the configurations of a communication apparatus 100 and a portable apparatus 200 according to the third embodiment. The communication apparatus 100 illustrated in FIG. 10 includes an imaging unit 11, an input unit 12, a display unit 13, a recording unit 110, a transceiving unit 16, an audio I/O unit 17, and a communication apparatus control unit 120.

The recording unit 110 includes a semiconductor memory such as a flash memory or a DRAM. The recording unit 110 includes a setting information recording unit 151, a content information recording unit 152, a signalizing information recording unit 153, and a character information recording unit 111. The character information recording unit 111 records character information when the communication apparatus control unit 120 converts a trajectory of the touch panel 14 by a user into a character by pattern matching or the like.

The communication apparatus control unit 120 includes a CPU or the like. The communication apparatus control unit 120 controls a process of the portable apparatus 200 en bloc, for example, by giving an instruction corresponding to each unit of the communication apparatus 100 according to an instruction signal, a switching signal, or the like from the input unit 12 or the touch panel 14 or transmitting data.

The detailed configuration of the communication apparatus control unit 120 will be described. The communication apparatus control unit 120 includes an image processing unit 181, a display control unit 186, a character converting unit 121, a setting unit 122, a character determining unit 123, a transmission control unit 124, and a communication unit 29.

The character converting unit 121 detects an approximate character through pattern matching on the trajectory of the touch panel 14 by the user based on the position signal input from the touch panel 14 and the character information recorded by the character information recording unit 111, and then converts the detected character as character information. For example, when the user draws “4” on the touch panel 14, the character converting unit 121 detects “4” as an approximate character through the pattern matching with reference to the character information recorded by the character information recording unit 111 and converts the detected character as the character information.

The setting unit 122 sets the character information converted by the character converting unit 121 as touch information used to establish the wireless communication with the portable apparatus 200 in the setting information of the communication apparatus 100 recorded by the setting information recording unit 151. The setting unit 122 records the touch information on the setting information recording unit 151.

The character determining unit 123 determines whether the character information as touch information received from the portable apparatus 200 by the transceiving unit 16 and used to establish the wireless communication with the communication apparatus 100 is identical with the character information as the touch information caused to correspond to the setting information recorded by the setting information recording unit 151.

The transmission control unit 124 establishes the wireless communication with the portable apparatus 200 based on the determination result of the character determining unit 123 and causes the transceiving unit 16 to transmit the content data to the portable apparatus 200. Specifically, when the character determining unit 123 determines that the character information received by the transceiving unit 16 is identical with the character information as the touch information recorded by the setting information recording unit 151, the transmission control unit 124 establishes the wireless communication with the portable apparatus 200 and causes the transceiving unit 16 to transmit the content data to the portable apparatus 200.

Next, the portable apparatus 200 will be described. The portable apparatus 200 includes an imaging unit 21, a transceiving unit 22, an audio I/O unit 23, a geomagnetic detecting unit 24, an input unit 25, a display unit 26, a touch panel 27, a recording unit 210, and a portable control unit 220.

The recording unit 210 includes a semiconductor memory such as a flash memory or a DRAM. The recording unit 210 includes a setting information recording unit 281, a content information recording unit 282, a signalizing information recording unit 283, and a character information recording unit 211. The character information recording unit 211 records character information when a trajectory of the touch panel 27 by a user is converted into a character by pattern matching or the like.

The portable control unit 220 includes a CPU or the like. The portable control unit 220 controls a process of the portable apparatus 200 en bloc, for example, by giving an instruction corresponding to each unit of the portable apparatus 200 according to an instruction signal, a switching signal, or the like from the input unit 25 or the touch panel 27 or transmitting data.

The detailed configuration of the portable control unit 220 will be described. The portable control unit 220 includes an image processing unit 301, a display control unit 306, a character converting unit 221, a setting unit 222, a character determining unit 223, and a transmission control unit 224.

The character converting unit 221 detects an approximate character through pattern matching on the trajectory of the touch panel 27 by the user based on the position signal input from the touch panel 27 and the character information recorded by the character information recording unit 211, and then converts the detected character as character information.

The setting unit 222 sets the character information converted by the character converting unit 221 as touch information indicating a password used to establish the wireless communication with the communication apparatus 100 in the setting information of the portable apparatus 200 recorded by the setting information recording unit 281. The setting unit 222 records the character information converted by the character converting unit 221 as the touch information indicating the password used to establish the wireless communication with the communication apparatus 100 on the setting information recording unit 281.

The character determining unit 223 determines whether the character information as touch information received from the communication apparatus 100 by the transceiving unit 22 and used to establish the wireless communication with the portable apparatus 200 is identical with the character information as the touch information caused to correspond to the setting information recorded by the setting information recording unit 281.

The transmission control unit 224 establishes the wireless communication with the communication apparatus 100 based on the determination result of the character determining unit 223 and causes the transceiving unit 22 to transmit the content data to the communication apparatus 100.

Figure 11:
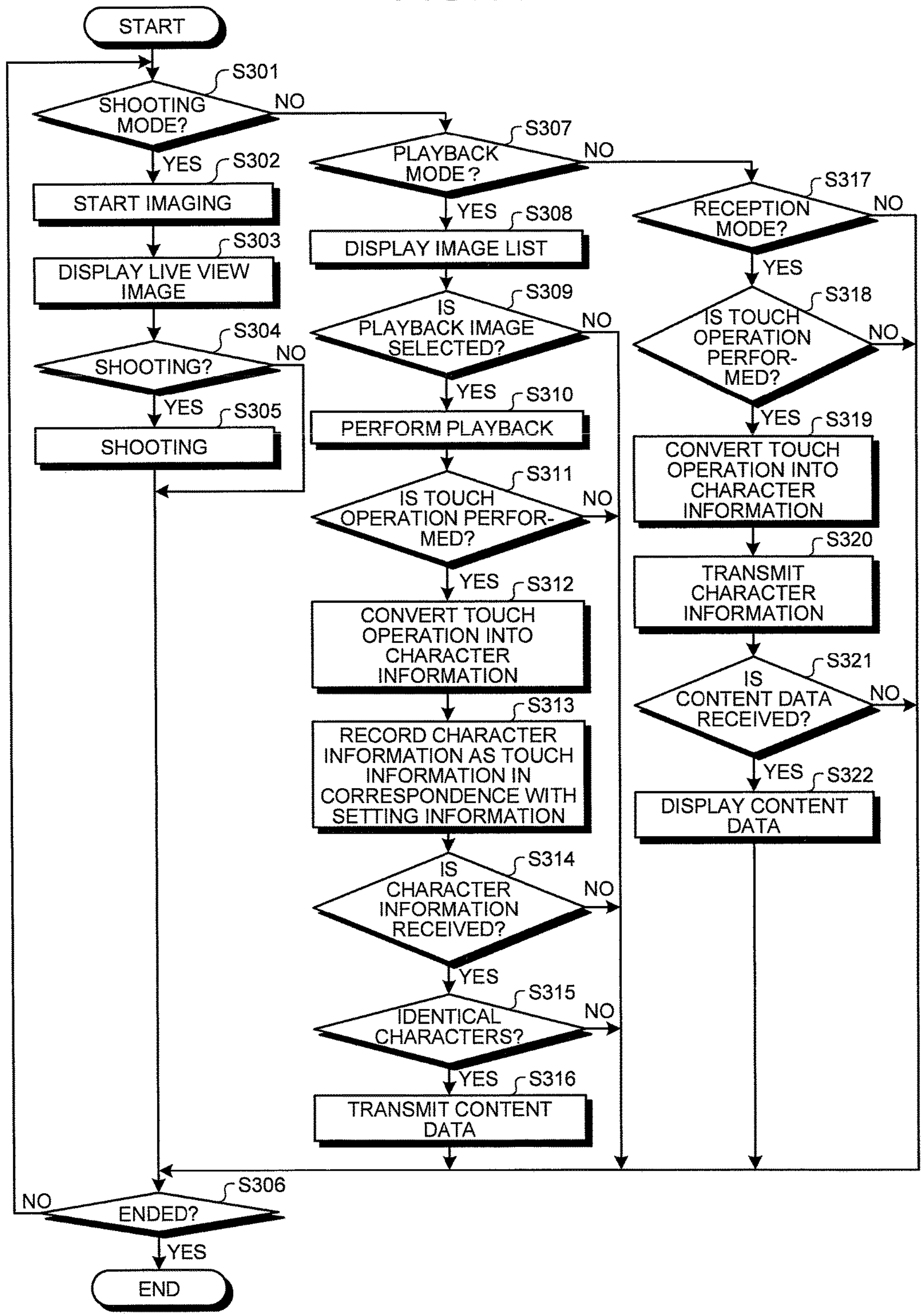
FIG. 11 is a flowchart illustrating an outline of a process executed by the communication apparatus according to the third embodiment of the present invention.

The overview of the process performed by the communication apparatus 100 with the above-described configuration will be described. FIG. 11 is a flowchart illustrating the overview of the process performed by the communication apparatus 100. The flowchart illustrated in FIG. 11 can be also performed likewise by the portable apparatus 200.

Step S301 to step S311 correspond to step S101 to step S111 of FIG. 6, respectively.

In step S312, the character converting unit 121 converts a touch operation of the touch panel 14 by the user into character information.

Subsequently, the setting unit 122 records the character information converted by the character converting unit 121 as the touch information indicating the password used to establish the wireless communication with the portable apparatus 200 in correspondence with the setting information of the communication apparatus 100 on the setting information recording unit 151 (step S313).

Thereafter, the communication apparatus control unit 120 determines whether the transceiving unit 16 receives the character information from the portable apparatus 200 (step S314). When the communication apparatus control unit 120 determines that the transceiving unit 16 receives the character information from the portable apparatus 200 (Yes in step S314), the communication apparatus 100 causes the process to proceed to step S315 to be described below. Conversely, when the communication apparatus control unit 120 determines that the transceiving unit 16 does not receive the character information from the portable apparatus 200 (No in step S314), the communication apparatus 100 causes the process to proceed to step S306.

In step S315, the character determining unit 123 determines whether the character information received from the portable apparatus 200 by the transceiving unit 16 is identical with the character information as the touch information caused to correspond to the setting information recorded by the setting information recording unit 151. When the character determining unit 123 determines that the character information received from the portable apparatus 200 by the transceiving unit 16 is identical with the character information as the touch information caused to correspond to the setting information recorded by the setting information recording unit 151 (Yes in step S315), the transmission control unit 124 causes the transceiving unit 16 to transmit the content data to the portable apparatus 200 (step S316). Thereafter, the communication apparatus 100 causes the process to proceed to step S306. Conversely, when the character determining unit 123 determines that the character information received from the portable apparatus 200 by the transceiving unit 16 is not identical with the character information as the touch information caused to correspond to the setting information recorded by the setting information recording unit 151 (No in step S315), the communication apparatus 100 causes the process to proceed to step S306.

Step S317 and step S318 correspond to step S116 and step S117 of FIG. 6, respectively.

In step S319, the character converting unit 121 converts the trajectory of the touch panel 14 by the user into character information.

Subsequently, the transmission control unit 124 causes the transceiving unit 16 to transmit the character information converted by the character converting unit 121 to the portable apparatus 200 (step S320).

Step S321 and step S322 correspond to step S120 and step S121 of FIG. 6, respectively.

In the above-described third embodiment of the invention, when the character information as the touch information received by the transceiving unit 16 is identical with the character information as the touch information set by the setting unit 122, the transmission control unit 124 establish the wireless communication between the portable apparatus 200 and the communication apparatus 100 and causes the transceiving unit 16 to transmit the content data to the portable apparatus 200. Thus, the security can be superior, the bidirectional wireless communication with the portable apparatus 200 can be performed through a simple operation, and the content data can be transmitted.

In the third embodiment, since the character drawn on the touch panel 14 by the user serves as the password used to establish the wireless communication between the communication apparatus 100 and the portable apparatus 200, the password used to establish the wireless communication can be performed through a simple operation.

In the third embodiment, the identification information (apparatus ID) may be also substituted with a sign or a character obtainable through the touch operation. That is, when the first half of the pattern written by the transmitting side is set as a portion configured to set the apparatus ID and the second half of the pattern is determined to serve as the password, various communication standards can be likewise conformed to. Therefore, when many apparatuses are communication candidates, the process of selecting an apparatus with which the communication is desired to be performed can be omitted, and thus the communication establishment can be performed through a simpler process. The communication establishment can be selected to various degrees of freedom according to the communication at the place, and thus the security can be improved. The degrees of freedom can be considerably varied by a procedure in which a finger or the like is moved in the two-dimensional space of the touch panel 14.

In the third embodiment, since a process such as a touch or a slide on the touch panel 14 is a process performed on the panel with a restricted area, anyone can simply perform an operation. Since both (or plural) communication sides imitate a motion of a finger or the like watching at the place, the communication both (or plural) sides may imitate a favorite sign, scribble, or the like as well as a character. Since an operation can be performed in a sense to write a character or a sense to draw a picture, a friendly operation common to humans can be performed, and thus the difficulty level of a difficult communication establishment method can be decreased.

In the third embodiment, a technique can be realized in a sense to make an attempt even for a user who has no confidence of communication. That is, the user can overcome a psychological hurdle and the use can be also promoted.

In the third embodiment, the character converting unit 121 converts the trajectory of the touch panel 14 into a character approximate to the trajectory. However, for example, an audio input from the audio I/O unit 17 may be analyzed and the audio may be converted into a character approximate to the analyzed audio. Thus, the password can be set when the wireless communication is established through a simpler operation.

Fourth Embodiment

Next, a fourth embodiment of the invention will be described. In the fourth embodiment, when a temporal change of a trajectory on a touch panel by a user is identical, wireless communication is established between a communication apparatus and a portable apparatus and content data is bidirectionally transmitted and received. Therefore, processes performed by the communication apparatus and the portable apparatus according to the fourth embodiment will be described below, after the communication apparatus and the portable apparatus according to the fourth embodiment are described. The same reference numerals are given to units having the same configurations as those of the first embodiment described above to make the description.

FIG. 12 is a block diagram illustrating the configurations of a communication apparatus 400 and a portable apparatus 500 according to the fourth embodiment. The communication apparatus 400 illustrated in FIG. 12 includes an imaging unit 11, an input unit 12, a display unit 13, a touch panel 14, a recording unit 15, a transceiving unit 16, an audio I/O unit 17, a posture detecting unit 401, a clock 402, and a communication apparatus control unit 410.

The posture detecting unit 401 includes a triaxial acceleration sensor, a gyro sensor, and the like and detects the posture of the communication apparatus 400. Specifically, the posture detecting unit 401 detects the posture of the communication apparatus 400, when it is assumed that X is the vertical direction of the communication apparatus 400 and Y is the thickness direction of the communication apparatus 400. The posture detecting unit 401 outputs the detected posture of the communication apparatus 400 to the communication apparatus control unit 410.

The clock 402 has a timing function and an imaging date determining function. The clock 402 outputs the current time to the communication apparatus control unit 410 to add time data to imaged image data.

The communication apparatus control unit 410 includes a CPU or the like. The communication apparatus control unit 410 controls a process of the communication apparatus 400 en bloc, for example, by giving an instruction corresponding to each unit of the communication apparatus 400 according to an instruction signal, a switching signal, or the like from the input unit 12 or the touch panel 14 or transmitting data.

The detailed configuration of the communication apparatus control unit 410 will be described. The communication apparatus control unit 410 includes an image processing unit 181, a display control unit 186, a touch position determining unit 411, a setting unit 412, a pattern determining unit 413, and a transmission control unit 414.

The touch position determining unit 411 determines the current touch position of the user on the touch panel 14 based on the position signal input from the touch panel 14 and the posture of the communication apparatus 400 detected by the posture detecting unit 401.

The setting unit 412 records the temporally changed touch information on the touch panel 14 by the user as a password used to establish the wireless communication with the portable apparatus 500 in correspondence with the setting information of the communication apparatus 400 recorded by the setting information recording unit 151 on the setting information recording unit 151.

The pattern determining unit 413 determines whether the temporally changed touch information received from the portable apparatus 500 by the transceiving unit 16 and used to establish the wireless communication with the portable apparatus 500 is identical with the temporally changed touch information caused to correspond to the setting information recorded by the setting information recording unit 151.

The transmission control unit 414 establishes the wireless communication with the portable apparatus 500 based on the determination result of the pattern determining unit 413 and causes the transceiving unit 16 to transmit the content data to the portable apparatus 500. Specifically, when the pattern determining unit 413 determines that the temporally changed touch information received by the transceiving unit 16 is identical with the temporally changed touch information caused to correspond to the setting information recorded by the setting information recording unit 151, the transmission control unit 414 establishes the wireless communication with the portable apparatus 500 and causes the transceiving unit 16 to transmit the content data to the portable apparatus 500.

Next, the portable apparatus 500 will be described. The portable apparatus 500 includes an imaging unit 21, a transceiving unit 22, an audio I/O unit 23, a geomagnetic detecting unit 24, an input unit 25, a display unit 26, a touch panel 27, a recording unit 28, a communication unit 29, a posture detecting unit 501, a clock 502, and a portable control unit 510. The posture detecting unit 501 and the clock 502 have the same configurations as the posture detecting unit 401 and the clock 402 of the communication apparatus 400, and thus the description thereof will not be repeated.

The portable control unit 510 includes a CPU or the like. The portable control unit 510 controls a process of the portable apparatus 500 en bloc, for example, by giving an instruction corresponding to each unit of the portable apparatus 500 according to an instruction signal, a switching signal, or the like from the input unit 25 or the touch panel 27 or transmitting data.

The detailed configuration of the portable control unit 510 will be described. The portable control unit 510 includes an image processing unit 301, a display control unit 306, a touch position determining unit 511, a setting unit 512, a pattern determining unit 513, and a transmission control unit 514.

The touch position determining unit 511 determines the current touch position of the user on the touch panel 27 based on the position signal input from the touch panel 27 and the posture of the portable apparatus 500 detected by the posture detecting unit 501.

The setting unit 512 records the temporally changed touch information on the touch panel 27 by the user as a password used to establish the wireless communication with the communication apparatus 400 in correspondence with the setting information of the portable apparatus 500 recorded by the setting information recording unit 281 on the setting information recording unit 281.

The pattern determining unit 513 determines whether the temporally changed touch information received from the communication apparatus 400 by the transceiving unit 22 and used to establish the wireless communication with the communication apparatus 400 is identical with the temporally changed touch information caused to correspond to the setting information recorded by the setting information recording unit 281.

The transmission control unit 514 establishes the wireless communication with the communication apparatus 400 based on the determination result of the pattern determining unit 513 and causes the transceiving unit 22 to transmit the content data to the communication apparatus 400.

Figure 13:
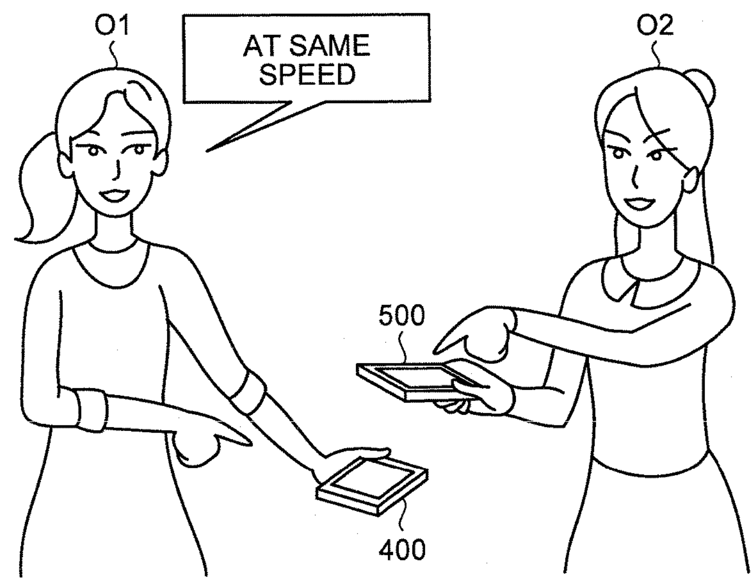
FIG. 13 is a diagram for describing an outline of a communication process executed by the communication apparatus and the portable apparatus according to the fourth embodiment of the present invention.
Figure 14:
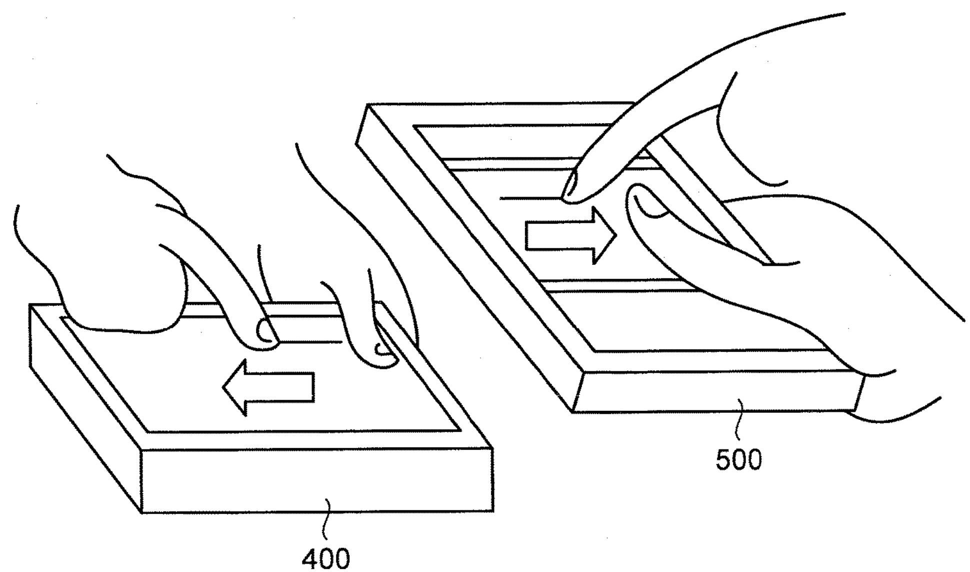
FIG. 14 is a diagram for schematically describing a state of FIG. 13.

The overview of the communication process performed by the communication apparatus 400 and the portable apparatus 500 with the above-described configurations will be described. FIG. 13 is a diagram illustrating the overview of the communication process performed by the communication apparatus 400 and the portable apparatus 500. FIG. 14 is a diagram schematically illustrating a status of FIG. 13. In FIGS. 13 and 14, the communication apparatus 400 is set to the playback mode and the portable apparatus 500 is set to the shooting mode.

As illustrated in FIGS. 13 and 14, when the communication apparatus 400 establishes the wireless communication with the portable apparatus 500 in conformity with a specified wireless communication standard and transmits the content data and when a touch operation is performed at the same speed on the touch panel 14 of the communication apparatus 400 as that on the touch panel 27 of the portable apparatus 500, the communication apparatus 400 establishes the wireless communication with the portable apparatus 500 and transmits the content data. For example, as illustrated in FIGS. 13 and 14, when a user O1 tells a user O2 that the user O2 performs a touch operation at the same speed and the users O1 and O2 perform slide operations at the same speed on the touch panel 14 of the communication apparatus 400 and the touch panel 27 of the portable apparatus 500, respectively, the communication apparatus 400 establishes the wireless communication with the portable apparatus 500 and transmits the content data.

Thus, when the user O1 of the communication apparatus 400 and the user O2 of the portable apparatus 500 merely perform the slide operations at the same speed on the touch panel 14 of the communication apparatus 400 and the touch panel 27 of the portable apparatus 500, the wireless communication can be established between the communication apparatus 400 and the portable apparatus 500 and the content data can be bidirectionally transmitted and received.

Figure 15:
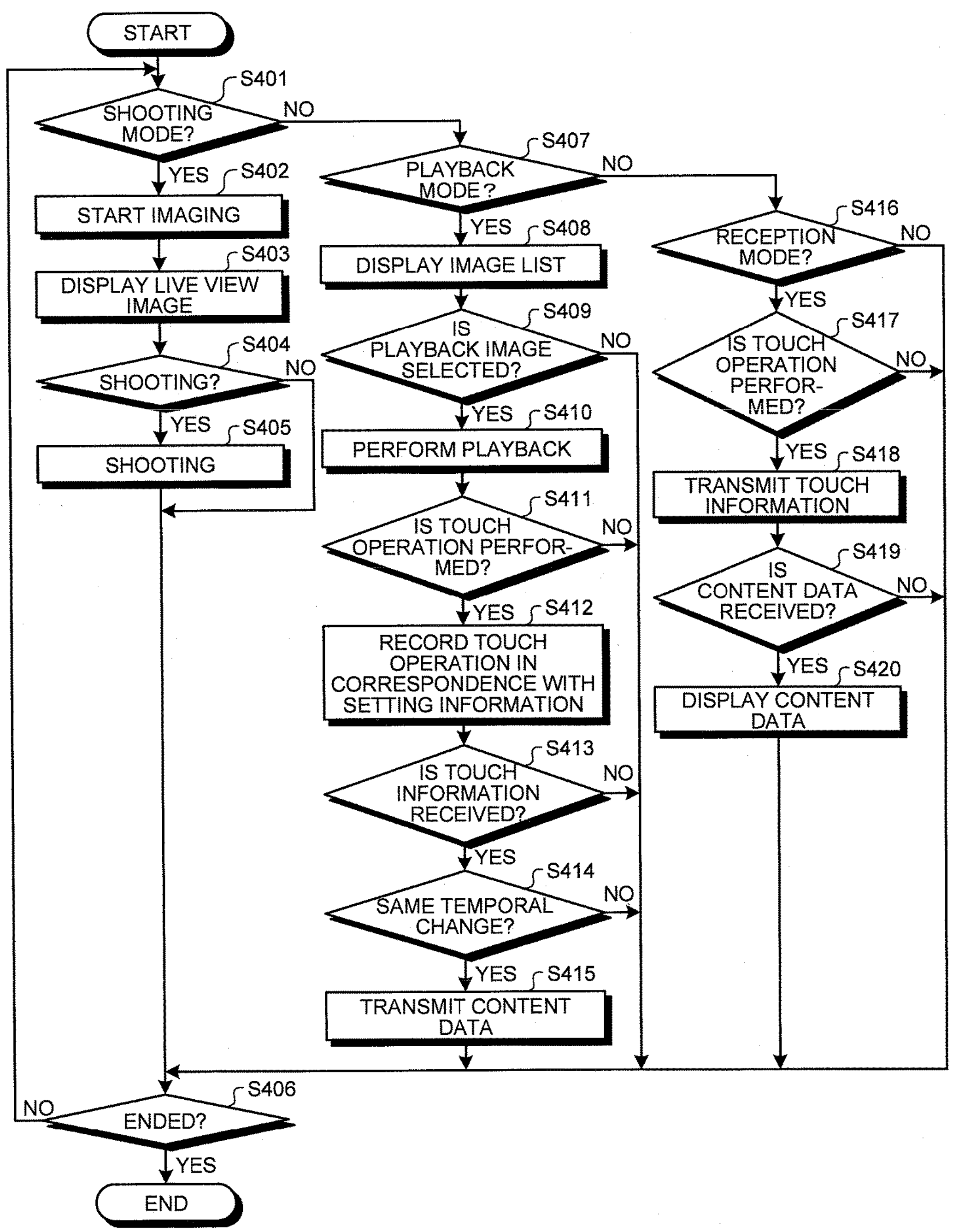
FIG. 15 is a flowchart illustrating an outline of a process executed by the communication apparatus according to the fourth embodiment of the present invention.

Next, the overview of the process performed by the communication apparatus 400 will be described. FIG. 15 is a flowchart illustrating the overview of the process performed by the communication apparatus 400. The flowchart illustrated in FIG. 15 can be also performed likewise by the portable apparatus 500.

Step S401 to step S411 correspond to step S101 to step S111 of FIG. 6, respectively.

Figure 16:
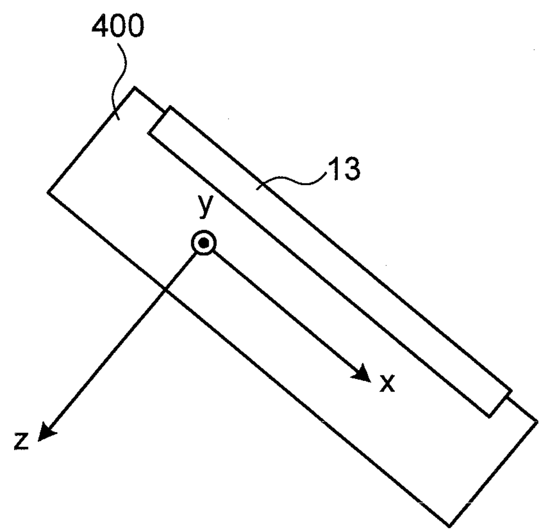
FIG. 16 is a diagram schematically illustrating a status of the communication apparatus when a touch position determining unit of the communication apparatus according to the fourth embodiment of the present invention determines a touch position.
Figure 17:
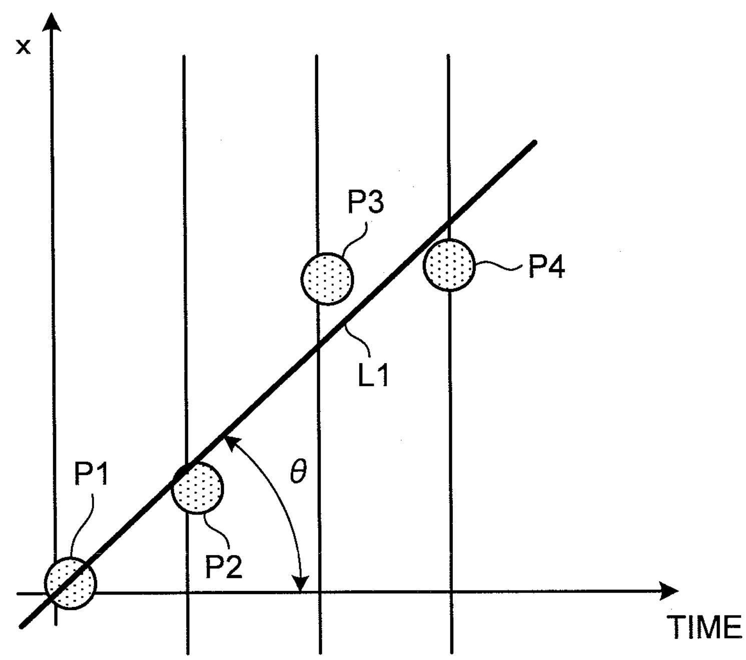
FIG. 17 is a graph of a relation between time and data of the touch position determined by the touch position determining unit of the communication apparatus according to the fourth embodiment of the present invention.

In step S412, the setting unit 412 records the temporally changed touch position on the touch panel 14 determined by the touch position determining unit 411 in correspondence with the setting information of the communication apparatus 400 on the setting information recording unit 151. FIG. 16 is a diagram schematically illustrating a status when the touch position determining unit 411 determines the touch position. FIG. 17 is a diagram illustrating a relation between a time and data of the touch position determined by the touch position determining unit 411. In FIG. 17, the vertical axis indicates coordinates obtained by converting the length direction (x axis) of the communication apparatus 400 according to the posture of the communication apparatus 400 and the horizontal axis indicates a time. As illustrated in FIGS. 16 and 17, the setting unit 412 obtains data of the touch position determined by the touch position determining unit 411 based on the posture of the communication apparatus 400 and records the data in correspondence with the setting information on the setting information recording unit 151. Specifically, the setting unit 412 calculates a straight line L1 approximating touch positions P1 to P4 detected specified timings by the touch position determining unit 411 based on the touch positions P1 to P4, obtains data of angles $\theta_x$ formed between the calculated straight line L1 and the time, and records the data in correspondence with the setting information on the setting information recording unit 151. The setting unit 412 calculates the straight line approximating the touch positions based on the touch positions detected in the lateral direction (y axis) of the communication apparatus 400 at each specified timing by the touch position determining unit 411, obtains data of the angles $\theta_y$ formed between the calculated straight line L1 and the time, and records the data in correspondence with the setting information on the setting information recording unit 151.

Subsequently, the communication apparatus control unit 410 determines whether the transceiving unit 16 receives the touch information from the portable apparatus 500 (step S413). When the communication apparatus control unit 410 determines that the transceiving unit 16 receives the touch information from the portable apparatus 500 (Yes in step S413), the communication apparatus 400 causes the process to proceed to step S414 to be described below. Conversely, when the communication apparatus control unit 410 determines that the transceiving unit 16 does not receive the touch information from the portable apparatus 500 (No in step S413), the communication apparatus 400 causes the process to proceed to step S406.

In step S414, the pattern determining unit 413 determines whether the touch information received from the portable apparatus 500 by the transceiving unit 16 and the touch information set by the setting unit 412 are subjected to the same temporal change. When the pattern determining unit 413 determines that the touch information received from the portable apparatus 500 by the transceiving unit 16 and the touch information set by the setting unit 412 are subjected to the same temporal change (Yes in step S414), the transmission control unit 414 causes the transceiving unit 16 to transmit the content data to the portable apparatus 500 (step S415). Thereafter, the communication apparatus 400 causes the process to proceed to step S406. Conversely, when the pattern determining unit 413 determines that the touch information received from the portable apparatus 500 by the transceiving unit 16 and the touch information set by the setting unit 412 are not subjected to the same temporal change (No in step S414), the communication apparatus 400 causes the process to proceed to step S406.

Step S416 to step S420 correspond to step S116 to step S121, respectively.

In the above-described fourth embodiment of the invention, when the temporally changed touch information received by the transceiving unit 16 is identical with the temporally changed touch information set by the setting unit 412, the transmission control unit 414 establishes the wireless communication between the portable apparatus 500 and the communication apparatus 400 and causes the transceiving unit 16 to transmit the content data to the portable apparatus 500. Thus, the security can be superior, the bidirectional wireless communication with the portable apparatus 500 can be performed through a simple operation, and the content data can be transmitted.

In the fourth embodiment, the identification information (apparatus ID) may be substituted with a sign or a character obtainable through the touch operation. That is, when the first half of the pattern written by the transmitting side is set as a portion configured to set the apparatus ID and the second half of the pattern is determined to serve as the password, various communication standards can be likewise conformed to. Therefore, when many apparatuses are communication candidates, the process of selecting an apparatus with which the communication is desired to be performed can be omitted, and thus the communication establishment can be performed through a simpler process. The communication establishment can be selected to various degrees of freedom according to the communication at the place, and thus the security can be improved. The degrees of freedom can be varied considerably by a procedure in which a finger or the like is moved in the two-dimensional space of the touch panel 14.

In the fourth embodiment, since a process such as a touch or a slide on the touch panel 14 is a process performed on the panel with a restricted area, anyone can simply perform an operation. Since both (or plural) communication sides imitate a motion of a finger or the like watching at that place, the communication both (or plural) sides may imitate a favorite sign, scribble, or the like as well as a character. Since an operation can be performed in a sense to write a character or a sensor to draw a picture, a friendly operation common to humans can be performed, and thus the difficulty level of a difficult communication establishment method can be decreased.

In the fourth embodiment, a technique can be realized in a sense to make an attempt even for a user who has no confidence of communication. That is, the user can overcome a psychological hurdle and the use can be also promoted.

Other Embodiments

In the invention, application can be realized such that a transmitting side establishes communication by performing a touch of designating a receiving side. In general, it is naturally considered that a receiving side spends a time and an effort. Depending on a relation between demand and supply, only when a receiving side gives permission, as in advertisement, a transmitting side may perform a designated drawing touch to perform communication.

In the present invention, content data and setting information are bidirectionally transmitted and received through the transceiving unit, but each of the communication apparatus and the portable apparatus may include a communication unit connectable to the Internet, content data and setting information may be bidirectionally transmitted and received via a network. Further, content data and setting information may be bidirectionally transmitted and received via a server on a network.

The invention may be applied even to a communication apparatus that performs bidirectional wireless communication with a portable apparatus that includes a touch panel detecting a touch of an object from the outside and receiving an input of a position signal according to a detected position, and transmits content data including image data. In this case, the communication apparatus includes a transceiving unit that is able to transmit the content data to the portable apparatus and receives trajectory information of the touch from the portable apparatus; and a transmission control unit that establishes the wireless communication between the portable apparatus and the communication apparatus and causes the transceiving unit to transmit the content data to the portable apparatus, when the trajectory information of the touch received by the transceiving unit is substantially identical with a preset trajectory of the touch. Thus, the security can be superior and the bidirectional wireless communication with another external apparatus can be performed through a simple operation.

The invention may be applied even to a communication apparatus that performs bidirectional wireless communication with a portable apparatus that includes a touch panel detecting a touch of an object from the outside and receiving an input of a position signal according to a detected position, and transmits content data including image data. In this case, the communication apparatus includes a transceiving unit that is able to transmit the content data to the portable apparatus and receives character information drawn by the touch from the portable apparatus; and a transmission control unit that performs the wireless communication between the portable apparatus and the communication apparatus, when drawing information of the touch received by the transceiving unit is substantially identical with preset character information. Thus, the security can be superior and the bidirectional wireless communication with another external apparatus can be performed through a simple operation.

The invention may be applied even to a communication apparatus that performs bidirectional wireless communication with a portable apparatus that includes a touch panel detecting a touch of an object from the outside and receiving an input of a position signal according to a detected position, and transmits content data including image data. In this case, the communication apparatus includes: a display unit that displays an image corresponding to the image data; a second touch panel that is superimposed on the display unit, detects a touch of an object from the outside, and receives an input of a position signal according to a detected position; and a display control unit that causes the display unit to display a trajectory of a touch operation performed on the second touch panel based on the position signal input from the second touch panel. Thus, the user can perform an intuitive operation to set a password and the bidirectional wireless communication can be performed with another external apparatus through a simple operation.

Further, in the present invention, the imaging unit has been described in connection with an example of a digital camera installed in one housing, but can be applied to a single-lens reflex digital camera configured with a lens device having a removable lens unit and a main body.

Further, the communication apparatus according to the present invention can be applied to an electronic apparatus such as a digital camera with a removable accessory, a digital video camera, a mobile phone having a shooting function, and a table type portable apparatus as well as a digital camera.

Further, a program executed by a communication apparatus according to the present invention is file data having an installable format or an executable format, and recorded in a computer readable recording medium such as a CD-ROM, a flexible disk (FD), a CD-R, a digital versatile disk (DVD), a USB medium, and a flash memory and provided.

Further, a program executed by a communication apparatus according to the present invention may be configured to be provided such that the program is stored in a computer connected to a network such as the Internet and downloaded via the network. Further, a program executed by the display device according to the present invention may be configured to be provided or distributed via a network such as the Internet.

In the description of the flowchart in this disclosure, a sequence of the process between steps is represented using expressions such as "first," "thereafter," and "next," but the sequence of the process necessary to implement the present invention is not uniquely decided by the expression. In other words, the sequence of the process in the flowchart described in this disclosure can be changed within a range having no contradiction.

As described above, the present invention includes various embodiments which are not described in this disclosure, and various design changes can be made within a range of a technical spirit set forth in claims.

Additional Note

A communication apparatus performs bidirectional wireless communication with a portable apparatus having a touch panel configured to detect a touch of an object from outside and to receive an input of a position signal according to a detected position, and transmits content data including image data.

The communication apparatus includes a control unit that sets setting information including identification information of the portable apparatus, a password corresponding to the identification information, and touch information on a touch pattern to be drawn on the touch panel of the portable apparatus to establish the wireless communication with the portable apparatus; and that establishes the wireless communication between the portable apparatus and the communication apparatus and transmits the content data to the portable apparatus when the touch information is identical with touch information received from the portable apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus that performs wireless communication with a portable apparatus, the communication apparatus comprising:

a processor that establishes the wireless communication between the portable apparatus and the communication apparatus; and a transceiving unit that (1) receives connection information from the portable apparatus when the communication apparatus is in a playback mode and the portable apparatus is in a reception mode, and (2) transmits, in accordance with control signals from the transmission control unit when the communication apparatus is in the playback mode and the portable apparatus is in the reception mode, content data to the portable apparatus, wherein the processor generates control signals causing the transceiving unit of the communication apparatus to transmit the content data to the portable apparatus responsive to a determination that the connection information received by the transceiving unit of the communication apparatus is substantially identical with preset setting information that was previously stored by the communication apparatus during the playback mode of the communication apparatus, when the communication apparatus is in the playback mode and the portable apparatus is in the reception mode.

2. The communication apparatus according to claim 1, wherein the connection information includes temporal change information of a position of touch on a touch panel of the portable apparatus.

3. The communication apparatus of claim 2, wherein the processor further determines whether the setting information and the temporal change information of the position of the touch received by the transceiving unit are identical with each other within a specified range, and wherein the processor causes the transceiving unit to transmit the content data to the portable apparatus according to determination of whether the setting information and the temporal change information of the position of the touch received by the transceiving unit are identical with each other within the specified range.

4. The communication apparatus according to claim 3, further comprising:

a display panel that displays content corresponding to the content data during the playback mode of the communication apparatus; and a second touch panel that (1) is superimposed on the display panel, (2) detects a touch of an object from outside, and (3) receives an input of a position signal according to a detected position wherein the processor further causes the display panel to display a path of a touch operation performed on the second touch panel based on a temporal change signal of the position input from the second touch panel.

5. The communication apparatus of claim 3, wherein the processor further converts the temporal change information of a position of the touch to at least one specific character, and stores the at least one specific character as the present setting information.

6. A communication apparatus that performs wireless communication with a portable apparatus, the communication apparatus comprising:

a processor that establishes the wireless communication between the portable apparatus and the communication apparatus;

a display panel that displays content corresponding to the content data during a playback mode of the communication apparatus;

a touch panel that receives a touch input operation by a user of the communication apparatus, wherein the processor further causes the display panel to display a path of the touch input received by the touch panel; and a transceiving unit that (1) receives connection information from the portable apparatus when the communication apparatus is in the playback mode and the portable apparatus is in a reception mode, wherein the connection information includes a touch input received by a touch panel of the portable apparatus, and (2) transmits, in accordance with control signals from the processor when the communication apparatus is in the playback mode and the portable apparatus is in the reception mode, content data to the portable apparatus, wherein the processor generates control signals causing the transceiving unit of the communication apparatus to transmit the content data to the portable apparatus responsive to a determination that the connection information received by the transceiving unit of the communication apparatus is substantially identical with preset setting information that was previously stored by the communication apparatus during the playback mode of the communication apparatus, when the communication apparatus is in the playback mode and the portable apparatus is in the reception mode.

7. A communication apparatus that performs wireless communication with a portable apparatus, the communication apparatus comprising:

a processor that establishes the wireless communication between the portable apparatus and the communication apparatus;

a display panel that displays content corresponding to the content data during a playback mode of the communication apparatus;

a touch panel that receives a touch input operation by a user of the communication apparatus, wherein the processor further causes the display panel to display a character corresponding to the touch input received by the touch panel; and a transceiving unit that (1) receives connection information from the portable apparatus when the communication apparatus is in the playback mode and the portable apparatus is in a reception mode, wherein the connection information includes a touch input received by a touch panel of the portable apparatus, and (2) transmits, in accordance with control signals from the processor when the communication apparatus is in the playback mode and the portable apparatus is in the reception mode, content data to the portable apparatus, wherein the processor generates control signals causing the transceiving unit of the communication apparatus to transmit the content data to the portable apparatus responsive to a determination that the connection information received by the transceiving unit of the communication apparatus corresponds to the character that was previously stored by the communication apparatus during the playback mode of the communication apparatus, when the communication apparatus is in the playback mode and the portable apparatus is in the reception mode.

8. A method performed by a communication apparatus, the method comprising:

recording, when the communication apparatus is in a playback mode, (1) content data and (2) first setting information, wherein the first setting information is communicated directly to a user of a portable apparatus;

receiving from the portable apparatus, when the communication apparatus is in the playback mode and the portable apparatus is in a reception mode, second setting information;

determining whether the first setting information recorded is substantially identical to the second setting information received; and responsive to a determination that the first setting information recorded is substantially identical to the second setting information received, (1) establishing wireless communication between the portable apparatus and the communication apparatus and (2) transmitting the content data recorded to the potable apparatus, when the communication apparatus is in the playback mode and the portable apparatus is in the reception mode.

9. The method of claim 8 wherein the first setting information is communicated orally from a user of the communication apparatus to the user of a portable apparatus.

10. The method of claim 8 wherein the first setting information is communicated directly to the user of a portable apparatus via a display of the first setting information on the communication apparatus.

11. The method of claim 10 wherein the first setting information is a character.

12. The method of claim 8 further comprising:

deleting the setting information after transmitting the content data to the portable apparatus.

13. A non-transitory computer readable recording medium with an executable program stored thereon, wherein the program instructs a processor, which is disposed in a communication apparatus, to execute:

recording, when the communication apparatus is in a playback mode, (1) content data and (2) first setting information, wherein the first setting information is communicated directly to a user of a portable apparatus;

receiving from the portable apparatus, when the communication apparatus is in the playback mode and the portable apparatus is in a reception mode, second setting information;

determining whether the first setting information recorded is substantially identical to the second setting information received; and responsive to a determination that the first setting information recorded is substantially identical to the second setting information received, (1) establishing wireless communication between the portable apparatus and the communication apparatus and (2) transmitting the content data recorded to the potable apparatus, when the communication apparatus is in the playback mode and the portable apparatus is in the reception mode.

14. The non-transitory computer readable recording medium of claim 13 wherein the first setting information is communicated orally from a user of the communication apparatus to the user of a portable apparatus.

15. The non-transitory computer readable recording medium of claim 13 wherein the first setting information is communicated directly to the user of a portable apparatus via a display of the first setting information on the communication apparatus.

16. The non-transitory computer readable recording medium of claim 15 wherein the first setting information is a character.

17. The non-transitory computer readable recording medium of claim 13 further comprising:

deleting the setting information after transmitting the content data to the portable apparatus.

* * * * *